United States Patent
Kang et al.

(10) Patent No.: US 9,633,225 B2
(45) Date of Patent: Apr. 25, 2017

(54) PORTABLE TERMINAL AND METHOD FOR CONTROLLING PROVISION OF DATA

(71) Applicant: Samsung Electronics Co., Ltd., Gyeonggi-do (KR)

(72) Inventors: Won-Do Kang, Gyeonggi-do (KR); Ji-Young Ho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 22 days.

(21) Appl. No.: 14/294,826

(22) Filed: Jun. 3, 2014

(65) Prior Publication Data
US 2015/0017958 A1 Jan. 15, 2015

(30) Foreign Application Priority Data
Jul. 12, 2013 (KR) ........................ 10-2013-0082435

(51) Int. Cl.
*H04M 3/00* (2006.01)
*G06F 21/62* (2013.01)
*H04L 29/08* (2006.01)
*H04M 1/725* (2006.01)

(52) U.S. Cl.
CPC .......... *G06F 21/6263* (2013.01); *H04L 67/22* (2013.01); *H04M 1/72522* (2013.01)

(58) Field of Classification Search
CPC ...... H04W 4/00–4/003; H04W 88/02–88/028; H04W 88/06; H04W 92/08
USPC ............... 455/418–421, 550.1, 552.1, 553.1, 455/563–569.1
See application file for complete search history.

(56) References Cited

U.S. PATENT DOCUMENTS

| | | | |
|---|---|---|---|
| 7,512,420 B2* | 3/2009 | Lichtenfeld | G06Q 10/10 455/412.1 |
| 2005/0130631 A1* | 6/2005 | Maguire | H04W 4/12 455/414.1 |
| 2006/0224681 A1* | 10/2006 | Wurster | H04L 51/18 709/206 |
| 2008/0020736 A1* | 1/2008 | Kim | H04M 1/72583 455/412.1 |
| 2008/0086754 A1* | 4/2008 | Chen | H04L 29/06027 725/105 |
| 2008/0200149 A1* | 8/2008 | Zinn | H04M 1/72547 455/412.1 |
| 2008/0220752 A1* | 9/2008 | Forstall | H04M 1/56 455/415 |
| 2008/0311961 A1* | 12/2008 | Cotevino | H04W 4/16 455/574 |
| 2011/0009103 A1* | 1/2011 | Do | G06F 3/0482 455/414.3 |

(Continued)

FOREIGN PATENT DOCUMENTS

| | | |
|---|---|---|
| KR | 1020070074779 | 7/2007 |
| KR | 1020070076658 | 7/2007 |

*Primary Examiner* — San Htun
(74) *Attorney, Agent, or Firm* — The Farrell Law Firm, P.C.

(57) ABSTRACT

A portable terminal and a method for controlling the provision of data are provided. The method includes analyzing information received or generated in response to an event; selecting a module that provides the analyzed information to a user of the portable terminal; and configuring data including the analyzed information, anthropomorphizes the configured data and providing the anthropomorphized data, through the selected module to the user.

33 Claims, 14 Drawing Sheets

(56) References Cited

U.S. PATENT DOCUMENTS

2011/0035687 A1\* 2/2011 Katis .................. H04L 12/1827
715/758

\* cited by examiner

PORTABLE TERMINAL AND METHOD FOR CONTROLLING PROVISION OF DATA

PRIORITY

This application claims priority under 35 U.S.C. §119(a) to Korean Patent Application Serial No. 10-2013-0082435, filed in the Korean Intellectual Property Office on Jul. 12, 2013, the entire disclosure of which is incorporated herein by reference.

BACKGROUND OF THE INVENTION

1. Field of the Invention

The present invention relates generally to a portable terminal, and more particularly, to a portable terminal and a method for controlling the provision of data.

2. Description of the Related Art

Recently, various services and additional functions that portable terminals provide have been gradually expanded. In order to increase the effective value of portable terminals and satisfy various needs of users, various applications that portable terminals can execute have been developed. Accordingly, anywhere from several to hundreds of applications can be stored in a portable terminal, such as a smart phone, a mobile phone, a laptop computer and a tablet Personal Computer (PC), which can move and includes a touch screen.

As described above, in order to satisfy the needs of users, portable terminals have evolved into multimedia devices which provide various multimedia services which use not only voice call services but also data communication services. As portable terminals come into wide use as described above, users can use the portable terminals regardless of time and places.

In this regard, a portable terminal according to the related art provides nothing more than information in the form of a pop-up or a particular page, in communicating with a user. As described above, the portable terminal according to the related art provides information only by a request from a user in the form of a pop-up or within an application, and thus the user-friendliness thereof is low. Accordingly, there is a need for an anthropomorphic portable terminal which is more friendly to a user and provides not only communication but also the transmission and reception of data to the user.

In this regard, it is required to provide user experience by anthropomorphizing a portable terminal and providing information capable of being user friendly.

SUMMARY OF THE INVENTION

The present invention has been made to address at least the above-mentioned problems and/or disadvantages and to provide at least the advantages described below. Accordingly, an aspect of the present invention is to provide a portable terminal and a method for controlling the provision of data.

Another aspect of the present invention is to allow an artificial intelligence engine, which provides communication with a human being, to be mounted to a portable terminal and thereby provide not only natural communication with the human being but also the transmission and reception of data by using the portable terminal to which the artificial intelligence engine is mounted.

In accordance with an aspect of the present invention, a method for providing data by a portable terminal is provided. The method includes analyzing information received or generated in response to an event; selecting a module that provides the analyzed information to a user of the portable terminal; and configuring data including the analyzed information and providing the configured data, through the selected module.

In accordance with another aspect of the present invention, a method for providing data by a portable terminal is provided. The method includes sensing reception of an event, and activating an artificial intelligence engine; analyzing an input request by the activated artificial intelligence engine and configuring data including a response to the analyzed request, when a user inputs the request for information; and providing the configured data by a module that has received the event.

In accordance with still another aspect of the present invention, a portable terminal that provides data is provided. The portable terminal includes a transmission/reception unit that receives an event to be provided to a user; and a controller configured to analyze reception of information matched to the event or generated information, select a module for providing a result of the analysis of the information, configure data including the result of the analysis of the information through the selected module, and control an output through the transmission/reception unit.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
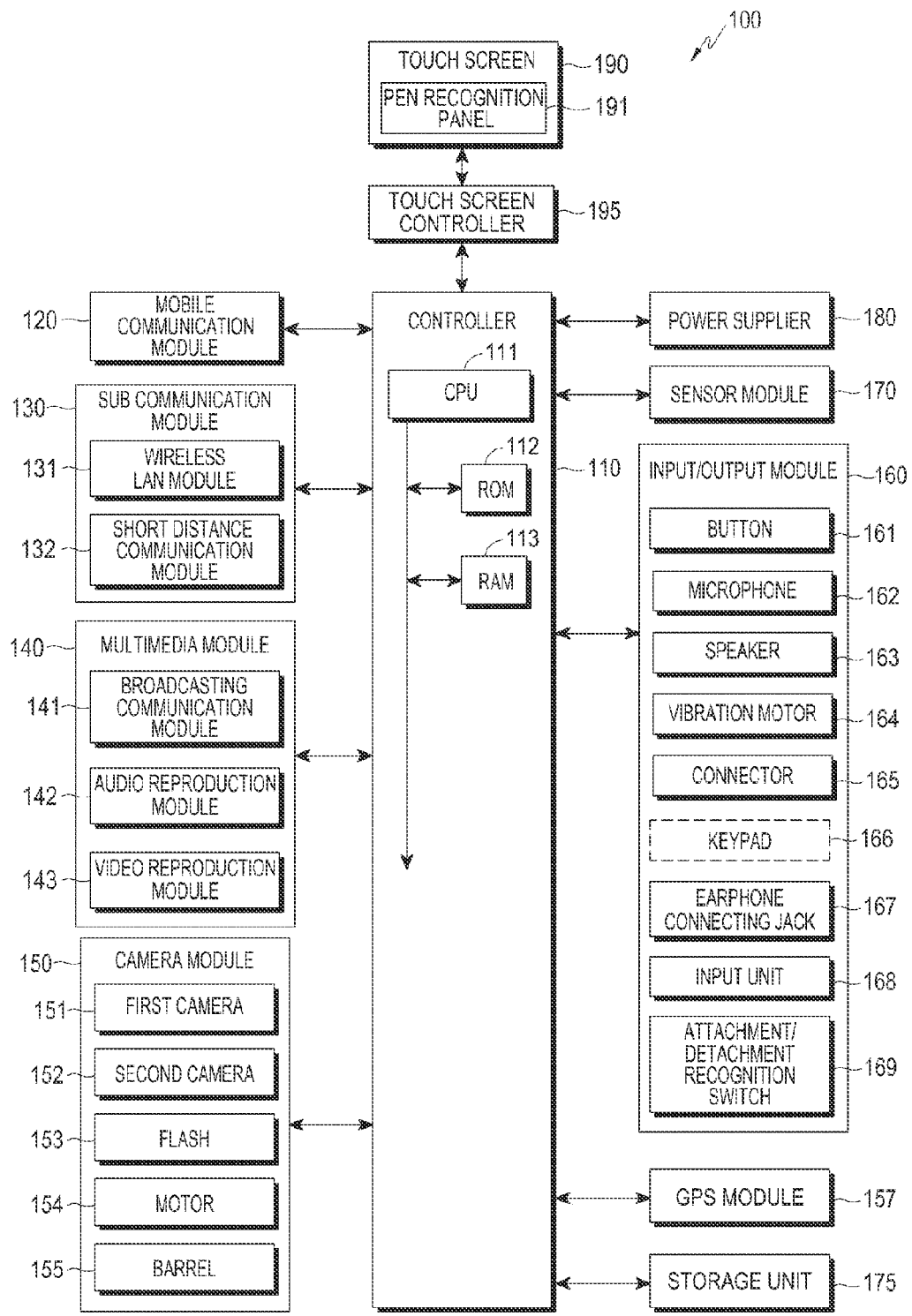
FIG. 1 is a block diagram schematically illustrating a configuration of a portable terminal according to an embodiment of the present invention.

The present invention will be described more fully hereinafter with reference to the accompanying drawings, in which illustrative embodiments of the invention are shown. This invention may, however, be embodied in many different forms and should not be construed as limited to the embodiments set forth herein. Rather, these embodiments are provided so that the description of this invention will be thorough and complete, and will fully convey the scope of the invention to those skilled in the art. The present invention will be defined by the appended claims.

The same or similar reference symbols are used throughout the drawings to refer to the same or like parts or components. Detailed descriptions of well-known functions and structures incorporated herein may be omitted to avoid obscuring the subject matter of the invention. For the same reasons, some components in the accompanying drawings are emphasized, omitted, or schematically illustrated, and the size of each component may not fully reflect its actual size. Accordingly, the present invention is not limited to the relative sizes and distances illustrated in the accompanying drawings.

Although ordinal numbers such as "first", "second", "third", etc. may be used to describe various elements, components, regions, layers and/or sections, these elements, components, regions, layers and/or sections should not be limited by those terms. These terms are only used to distinguish one element, component, region, layer or section from another. Thus, a first element, component, region, layer or section discussed below could be termed a second element, component, region, layer or section without departing from the teachings of the inventive concept. Descriptions shall be understood as to include any and all combinations of one or more of the associated listed items when the items are described by using the conjunctive term "and/or" or the like.

It is to be understood that the singular forms "a", "an" and "the", include plural references unless the context clearly dictates otherwise. It will be further understood that the terms "has", "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Terms used in the present invention are defined as follows.

A "portable terminal" is a mobile terminal which can be carried and can transmit and receive data, i.e. a voice call or a video call, and may include at least one touch screen. Examples of a portable terminal may include a smart phone, a tablet, a personal computer (PC), a three-dimensional television (3D-TV), a smart TV, a Light-Emitting Diode (LED) TV and a Liquid Crystal Display (LCD) TV, and may also include all terminals capable of communicating with a peripheral device or another terminal located at a distance.

An "input unit" may be at least one of an electronic pen and a stylus pen which can provide a command or an input to the portable terminal in a state of contact on a touch screen or in a state of non-contact such as hovering.

An "object" is displayed or can be displayed on a touch screen of the portable terminal. Examples of the object may include at least one of a document, a widget, a photograph, a map, a moving image, an e-mail, a Short Message Service (SMS) message and a Multimedia Messaging Service (MMS) message. An object can be executed, deleted, cancelled, stored, and changed by the input unit. An object may be used as a meaning including a shortcut icon, a thumbnail image, and a folder, which stores at least one object, in the portable terminal.

A "shortcut icon" is displayed on the touch screen of the portable terminal in order to quickly execute a telephone call, access a contact or a menu, and the like that each application or the portable terminal generally provides. When a command or an input for executing the shortcut icon is received, an associated application is executed.

The term "transmission/reception" refers to a case in which the portable terminal transmits information or data so as to enable the user to recognize the information or data and receives information or data from the user.

FIG. 1 is a block diagram illustrating a configuration of a portable terminal according to an embodiment of the present invention.

Referring to FIG. 1, the portable terminal 100 includes a controller 110, a mobile communication module 120, a sub-communication module 130, a multimedia module 140, a camera module 150, a Global Positioning System (GPS) module 157, an input/output module 160, a sensor module 170, a storage unit 175, and a power supplier 180, at least one touch screen 190, and at least one touch screen controller 195.

According to embodiments of the present invention, the portable terminal 100 may be connected to an external device (not illustrated) by using at least one of the mobile communication module 120, the sub-communication module 130, a connector 165 and an earphone connection jack 167. Examples of the external device may include various devices, such as earphones, an external speaker, a Universal Serial Bus (USB) memory, a charger, a cradle/dock, a Digital Multimedia Broadcasting (DMB) antenna, a device related to mobile payment, a health care device (e.g., a blood glucose meter or the like), a video game console, and a car navigation device. Each of these removable devices may be connected to the portable terminal 100 by wire. Additional examples of the external device may include a Bluetooth communication device, a Near Field Communication (NFC) device, a Wi-Fi direct communication device, and a wireless Access Point (AP), each of which may be wirelessly connected to the portable terminal 100. Further, the portable terminal 100 may be connected to other devices, such as a mobile phone, a smart phone, a tablet Personal Computer (PC), a desktop PC and a server, by wire or wirelessly.

According to an embodiment of the present invention, the sub-communication module 130 includes at least one of a wireless Local Area Network (LAN) module 131 and a short-distance communication module 132 (e.g., a Near Field Communication (NFC) module). According to an embodiment of the present invention, the multimedia module 140 includes at least one of a broadcasting communication module 141, an audio reproduction module 142, and a video reproduction module 143.

According to an embodiment of the present invention, the camera module 150 includes at least one of a first camera 151 and a second camera 152. Also, depending on the main use of the portable terminal 100, the camera module 150 of the portable terminal 100 according to an embodiment of the present invention may include at least one of a barrel 155 for zoom-in/zoom-out of the first camera 151 and/or the second camera 152, a motor 154 which controls the movement of the barrel 155 for zoom-in/zoom-out of the barrel 155, and a flash 153 which provides light in order to capture an image.

According to an embodiment of the present invention, the input/output module 160 includes at least one button 161, a microphone 162, a speaker 163, a vibration motor 164, the connector 165 and a keypad 166. The input/output module 160 may include the earphone connection jack 167, an input unit 168, a detachment/attachment recognition switch 169, and the like.

The controller 110 may include a Central Processing Unit (CPU) 111, a Read-Only Memory (ROM) 112 which stores a control program for controlling the portable terminal 100, and a Random Access Memory (RAM) 113 which stores a signal or data received from the outside of the portable terminal 100 or is used as a memory area for a task performed by the portable terminal 100. The CPU 111 may include multiple processors. For example, the CPU 111 may include a single-core processor, a dual-core processor, a triple-core processor, a quad-core processor, and the like. The CPU 111, the ROM 112 and the RAM 113 may be interconnected by an internal bus.

The controller 110 controls the mobile communication module 120, the sub-communication module 130, the multimedia module 140, the camera module 150, the GPS module 157, the input/output module 160, the sensor module 170, the storage unit 175, the power supplier 180, the touch screen 190, and the touch screen controller 195.

The controller 110 determines whether there exists the recognition of hovering caused by the proximity of the input unit 168 (e.g., an electronic pen, etc.) enabling a touch to any one object in a state of displaying multiple objects on the touch screen 190, and identifies an object matched to the position of occurrence of the hovering. Also, the controller 110 senses a height from the portable terminal 100 to the input unit 168 and a hovering input event according to the height. The hovering input event includes at least one of pressing of each button included in the input unit 168, tapping of the input unit 168, the movement of the input unit 168 which is faster than a predetermined speed, and a touch to each object.

Also, the controller 110 analyzes information received or generated in response to an event, selects a module for providing the analyzed information to the user of the portable terminal, controls the selected module to configure data including the analyzed information so as to be anthropomorphized, and controls the selected module to provide the anthropomorphized data to the user. When the user uses the selected module to input a request for information, the controller 110 controls the selected module to configure data corresponding to a response to the input request so as to be anthropomorphized, and controls the selected module to provide the anthropomorphized data to the user. Also, the controller 110 extracts a keyword from the received or generated event, and configures data so as to anthropomorphize the data by using the extracted keyword and so as to provide the anthropomorphized data to the user. The term "Configuring data" refers to a configuration for outputting a voice, an image or a message to the user and enabling the user to recognize the voice, the image or the message. Also, the modules which serve to provide information received in response to an event to the user, may differ from each other depending on the type of event. In the present example, the event is used to give notice to the user, and may include at least one of the reception of an e-mail, the receipt of a text message, the generation of a shortage of battery residual quantity and the receipt of a call. The module may include at least one of a voice call module, a video call module, a text message module, a pop-up window module and an e-mail module. When the event is the receipt of an e-mail or the receipt of a text message, the controller 110 extracts at least one of a keyword and a picture included in the received e-mail or text message, configures data by using the extracted keyword and/or picture, and provides the configured data to the user through at least one of a voice call, a video call and a pop-up window.

When the reception of an event is sensed, the controller 110 activates an artificial intelligence engine. Next, when the user inputs a request for information, the controller 110 controls the activated artificial intelligence engine to analyze the input request, configures data including a response to the analyzed request, controls a module, which has received the event, to configure data so as to be anthropomorphized, and controls the module to provide the anthropomorphized data to the user. The event may include at least one of a call and a message which are received from the user. When an event is a call received from the user, the artificial intelligence engine analyzes the request by using a voice received as input from the user under the control of a controller 110. When an event is the reception of a message, the artificial intelligence engine analyzes the request by using the text of a message received as input from the user. The artificial intelligence engine is an engine for providing communication with the user of the portable terminal under the control of the controller 110. Under the control of the controller 110, the artificial intelligence engine extracts a response to the analyzed request from pre-stored information, or connects to a server which stores information matched to the analyzed request; receives a response from the server; and provides the received response to the user. In an embodiment of the present invention, the artificial intelligence engine may be included in the controller 110 or in a separate apparatus. The artificial intelligence engine communicates with the user through at least one of a voice call, a video call and the transmission/receipt of a message, and configures data so as to provide a response to the request to the user, as a voice, a image or a message.

According to the control of the controller 110, the mobile communication module 120 allows the portable terminal 100 to be connected to an external device through mobile communication by using at least one or more antennas (not illustrated). The mobile communication module 120 transmits and receives wireless signals for voice calls, video calls, Short Message Service (SMS) messages, a Multimedia Messaging Service (MMS) messages, and the like to/from a mobile phone, a smart phone, a tablet PC or another device, which has a telephone number input to the portable terminal 100.

According to the control of the controller 110, the wireless LAN module 131 may be connected to the Internet at a place where a wireless Access Point (AP) is installed. The wireless LAN module 131 supports a wireless LAN standard (e.g., IEEE 802.11x of the Institute of Electrical and Electronics Engineers (IEEE)). According to the control of the controller 110, the short-range communication module 132 enables the portable terminal 100 to perform short-range wireless communication with an image forming device. Examples of a short-range communication scheme may include Bluetooth, Infrared Data Association (IrDA), Wi-Fi direct communication, NFC, and the like.

According to embodiments of the present invention, the portable terminal 100 may include at least one of the mobile communication module 120, the wireless LAN module 131 and the short-range communication module 132. In embodiments of the present invention, the "transmission/reception unit" consists of the touch screen 190 and at least one of the mobile communication module 120, the wireless LAN module 131 or the short-range communication module 132. This configuration does not reduce the scope of the present invention. The multimedia module 140 may include the broadcasting communication module 141, the audio reproduction module 142, and/or a moving image reproduction module 143. According to the control of the controller 110, the broadcasting communication module 141 receives a broadcast signal (e.g., a TV broadcast signal, a radio broadcast signal, a data broadcast signal, etc.) and additional broadcast information (e.g., an Electronic Program Guide (EPG) or an Electronic Service Guide (ESG)), which are transmitted by a broadcast station through a broadcast communication antenna. According to the control of the controller 110, the audio reproduction module 142 reproduces stored or received digital audio files (e.g., a file having a file extension of mp3, wma, ogg, or wav). According to the control of the controller 110, the moving image reproduction module 143 reproduces stored or received digital moving image files (e.g., a file having a file extension of mpeg, mpg, mp4, avi, mov, or mkv). The moving image reproduction module 143 may also reproduce digital audio files.

According to an embodiment of the present invention, the multimedia module 140 may include the audio reproduction module 142 and the moving image reproduction module 143, without including the broadcasting communication module 141. According to another embodiment of the present invention, the audio reproduction module 142 or the moving image reproduction module 143 of the multimedia module 140 may be included in the controller 110.

The camera module 150 includes at least one of the first camera 151 and the second camera 152, each for capturing a still image or a moving image according to the control of the controller 110. Also, the camera module 150 may include at least one of the barrel 155 which performs zoom-in/zoom-out in order to capture an image of a subject, the motor unit 154 which controls the movement of the barrel 155, and the flash 153 which provides additional light to be used when capturing an image of the subject. The first camera 151 may be mounted on a front surface of the portable terminal 100, and the second camera 152 may be mounted on a rear surface of the portable terminal 100. Alternatively, the first camera 151 and the second camera 152 may be disposed adjacent to each other (e.g., a distance between the first camera 151 and the second camera 152 may be greater than 1 cm and is less than 8 cm), and, in such a configuration, the first camera 151 and the second camera 152 may capture a three-dimensional still image or a three-dimensional moving image.

Also, each of the first camera 151 and the second camera 152 may include a lens system, an image sensor, and the like. Each of the first camera 151 and the second camera 152 converts an optical signal, which has been received (or captured) through the lens system, into an electrical image signal, and outputs the electrical image signal to the controller 110. A user captures a moving image or a still image by using each of the first camera 151 and the second camera 152.

The GPS module 157 receives a radio signal from each of multiple GPS satellites in the Earth's orbit, and calculates a location of the portable terminal 100 by using the Time Of Arrival (TOA) of the received radio signal from each of the GPS satellites to the portable terminal 100.

The input/output module 160 includes at least one input/output device, such as at least one of the multiple buttons 161, the microphone 162, the speaker 163, the vibration motor 164, the connector 165, the keypad 166, the earphone connection jack 167 and the input unit 168. For example, cursor control such as a mouse, a trackball, a joystick or cursor direction keys, although not limited thereto, may be provided to the input/output module 160 in order to transmit and receive information to/from the controller 110 and in order to control the movement of a cursor on the touch screen 190.

The buttons 161 may be disposed on a front surface, a lateral surface or a rear surface of a housing of the portable terminal 100, and may include at least one of a power/lock button a volume button, a menu button, a home button, a back button and a search button (not illustrated).

According to the control of the controller 110, the microphone 162 receives a voice or sound as input, and generates an electrical signal according to the received input.

According to the control of the controller 110, the speaker 163 outputs sounds matched to various signals (e.g., a wireless signal, a broadcast signal, a digital audio file, a digital moving image file, and photographing) from the mobile communication module 120, the sub-communication module 130, the multimedia module 140 and the camera module 150, to the outside of the portable terminal 100. The speaker 163 may output a sound (e.g., a button operation sound or a ring back tone matched to a telephone call) matched to a function that the portable terminal 100 performs. The portable terminal 100 may include multiple speakers. The speaker 163 or the multiple speakers may be disposed at an appropriate position or positions of the housing of the portable terminal 100 for directing output sounds.

According to the control of the controller 110, the vibration motor 164 converts an electrical signal into a mechanical vibration. For example, when the portable terminal 100 in a vibration mode receives a voice call from another device, the vibration motor 164 of the portable terminal 100 operates. The portable terminal 100 may include multiple vibration motors. The vibration motor 164 or the multiple vibration motors may be mounted within the housing of the portable terminal 100. The vibration motor 164 operates in response to a touch action of a user who touches the touch screen 190 and a continuous movement of a touch on the touch screen 190.

The connector 165 is used as an interface for connecting the portable terminal 100 to an external device (not illustrated) or a power source. According to the control of the controller 110, through a wired cable connected to the connector 165, the portable terminal 100 transmits data stored in the storage unit 175 of the portable terminal 100 to an external device and/or receives data from the external device. Also, through the wired cable connected to the connector 165, the portable terminal 100 may be supplied with power from the power source or may charge a battery by using the power source.

The keypad 166 receives key input from the user in order to control the portable terminal 100. The keypad 166 includes a physical keypad mounted on the front surface of the portable terminal 100 and/or a virtual keypad displayed on the touch screen 190. According to an embodiment of the present invention, the physical keypad mounted on the front surface of the portable terminal 100 may be omitted.

Earphones are inserted into the earphone connection jack 167 and thereby are connected to the portable terminal 100. The input unit 168 is inserted into the inside of the portable terminal 100, and is kept in the portable terminal 100. When the input unit 168 is used, the input unit 168 is drawn and detached from the portable terminal 100. The detachment/attachment recognition switch 169 which operates in response to the attachment or detachment of the input unit 168, is mounted in one area of the inside of the portable terminal 100 into which the input unit 168 is inserted. The detachment/attachment recognition switch 169 provides a signal matched to the attachment or detachment of the input unit 168 to the controller 110. The detachment/attachment recognition switch 169 is provided in one area into which the input unit 168 is inserted, and is configured to come into contact with the input unit 168 directly or indirectly when the input unit 168 is attached (or mounted). Accordingly, the detachment/attachment recognition switch 169 generates a signal matched to the attachment or detachment of the input unit 168 based on a direct or indirect contact with the input unit 168, and provides the generated signal to the controller 110.

The sensor module 170 includes at least one sensor for detecting the state of the portable terminal 100. For example, the sensor module 170 may include a proximity sensor for detecting whether the user is close to the portable terminal 100, an illuminance sensor (not illustrated) for detecting the amount of light around the portable terminal 100, a motion sensor (not illustrated) for detecting the motion of the portable terminal 100 (e.g., the rotation of the portable terminal 100, or acceleration or vibration applied to the portable terminal 100), a geomagnetic sensor for detecting a point of the compass by using the Earth's magnetic field, a gravity sensor for detecting the working direction of gravity, an altimeter for measuring atmospheric pressure and detecting an altitude, and the like. At least one sensor may detect the state of the portable terminal 100, may generate a signal matched to the detection, and may transmit the generated signal to the controller 110. According to the performance of the portable terminal 100, sensors may be added to or removed from the sensor module 170.

According to the control of the controller 110, the storage unit 175 may store a signal or data which is input/output in response to an operation of each of the mobile communication module 120, the sub-communication module 130, the multimedia module 140, the camera module 150, the GPS module 157, the input/output module 160, the sensor module 170, and the touch screen 190. The storage unit 175 may store a control program for controlling the portable terminal 100 or a control program for the controller 110, and applications.

The term "storage unit" may refer to any one of or a combination of the storage unit 175, the ROM 112 and the RAM 113 within the controller 110, or a memory card, such as a Secure Digital (SD) card or a memory stick, which is mounted on the portable terminal 100. The storage unit may include a non-volatile memory, a volatile memory, a Hard Disk Drive (HDD), a Solid State Drive (SSD), and the like.

Also, the storage unit 175 stores applications for various functions such as navigation, a video call, games and an application giving a user a time-based alarm; images for providing a Graphical User Interface (GUI) related to the applications; user information; documents; databases or data related to a method for processing a touch input; background images (e.g., a menu screen image, a standby screen image, etc.) or operating programs, which are required to drive the portable terminal 100; images captured by the camera module 150; and the like. The storage unit 175 is a medium readable by a machine (e.g., a computer), also known as a machine-readable medium. The term "machine-readable medium" is defined as a medium which provides data to the machine in order to enable the machine to perform a particular function. The machine-readable medium may be a storage medium. The storage unit 175 may include a non-volatile medium and a volatile medium. All of these mediums must be of a type which may be detected by a physical instrument which causes instructions delivered by the mediums to be read into the machine.

The machine-readable medium, although not limited thereto, includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM.

According to the control of the controller 110, the power supplier 180 may supply power to one or more batteries disposed in the housing of the portable terminal 100. The one or more batteries supply power to the portable terminal 100. Also, the power supplier 180 may supply power provided by an external power source to the portable terminal 100 through a wired cable connected to the connector 165. Also, the power supplier 180 may supply power, which is wirelessly provided by an external power source, to the portable terminal 100 by using a wireless charging technology.

The portable terminal 100 may include at least one touch screen 190 which provides the user with a user interface matched to various services (e.g., telephone call, data transmission, broadcasting, and photography). The at least one touch screen 190 transmits an analog signal matched to at least one touch, which is input to the user interface, to the relevant touch screen controller 195. As described above, the portable terminal 100 may include multiple touch screens, and may include the touch screen controllers which receive analog signals matched to touches from the touch screens, respectively. The touch screens may be connected to multiple housings by hinge connections. Alternatively, the multiple touch screens may be disposed at one housing, without a hinge connection. The portable terminal 100 according to an embodiment of the present invention may include at least one touch screen, as described above. Hereinafter, for convenience of description, a case will be described in which the portable terminal 100 includes one touch screen.

The touch screen 190 may receive at least one touch as input from the user's body (e.g., fingers, thumbs, etc.) or an input means (e.g., a stylus pen, and an electronic pen) enabling a touch. Also, the touch screen 190 includes a pen recognition panel 191 which recognizes a touch input when the touch input is received through a pen such as a stylus pen or an electronic pen. The pen recognition panel 191 detects a distance between the pen and the touch screen 190 through a magnetic field. Also, the touch screen 190 may receive, as input, a continuous movement of one touch. The touch screen 190 may transmit an analog signal matched to a continuous movement of an input touch, to the touch screen controller 195.

Further, according to embodiments of the present invention, a touch is not limited to a contact between the touch screen 190 and the user's body part or the input means enabling a touch, but may include a non-contact (e.g., a case in which there exists a distance which can be detected without a contact between the touch screen 190 and the user's body part or the input means enabling a touch). In the touch screen 190, a detectable distance may change depending on the performance or structure of the portable terminal 100. Particularly, in order to enable the detection of both a touch event due to the contact between the touch screen 190 and the user's body part or the input means enabling a touch and an event of input in a non-contact state (e.g., hovering) in such a manner as to distinguish the touch event from the hovering event, the touch screen 190 is configured in such a manner that the touch screen 190 may output different values (e.g., current values or voltage values as analog values) detected during the touch event and detected during the hovering event. Further, it is desirable that the touch screen 190 outputs different detected values (e.g., current values) according to a distance between space, in which the hovering event occurs, and the touch screen 190.

The touch screen 190, for example, may be implemented as a resistive touch screen, a capacitive touch screen, an infrared touch screen, a surface acoustic wave touch screen, and/or the like.

Also, in order to enable the touch screen 190 to sequentially or simultaneously receive input from the user's body and input from the input means enabling a touch, the touch screen 190 may include at least two touch screen panels which may sense the touch or proximity of the user's body and the input means enabling a touch, respectively. The at least two touch screen panels provide different output values to the touch screen controller 195, and the touch screen controller 195 recognizes the values received from the at least two touch screen panels as different values. Accordingly, the touch screen controller 195 may determine whether input from the touch screen 190 is input from the user's body part, or input from the input means enabling a touch. The touch screen 190 then displays one or more objects.

More specifically, the touch screen 190 may be formed in a structure such that a panel which senses an input by the input unit 168 through a change in induced electromotive force and a panel which senses the touch of the user's finger on the touch screen 190 are stacked in order in such a manner that they adhere to each other or are spaced apart from each other. The touch screen 190 includes multiple pixels, and displays an image by using the pixels. The touch screen 190 may employ a LCD, Organic Light-Emitting Diodes (OLEDs), LEDs, and the like.

Also, when the input unit 168 touches a surface of the touch screen 190 or is located at a predetermined distance from the surface of the touch screen 190, the touch screen 190 includes multiple sensors which detect a position at which the input unit 168 is located. Each of the multiple sensors may be formed in a coil structure. In a sensor layer that the multiple sensors form, the multiple sensors have preset patterns, respectively, and form multiple electrode lines. Due to this structure, when the input unit 168 touches the touch screen 190 or generates a hovering input on the touch screen 190, a sensing signal having a waveform changed due to a magnetic field between the sensor layer and the input unit 168 is generated in the touch screen 190. The touch screen 190 provides the generated sensing signal to the controller 110. When the user's finger touches the touch screen 190, the touch screen 190 provides a sensing signal due to capacitance (or electrostatic capacity) to the controller 110. Then, a predetermined distance between the input unit 168 and the touch screen 190 is detected through the strength of a magnetic field formed by a coil 510. Hereinafter, a process for setting the strength of vibration will be described in more detail.

Meanwhile, the touch screen controller 195 converts an analog signal received from the touch screen 190 into a digital signal (e.g., X and Y coordinates), and provides the digital signal to the controller 110. The controller 110 controls the touch screen 190 by using the digital signal received from the touch screen controller 195. For example, in response to a touch event or a hovering event, the controller 110 causes a shortcut icon displayed on the touch screen 190 to be selected, or causes the shortcut icon to be executed. According to an embodiment of the present invention, the touch screen controller 195 may be included in the controller 110.

Further, the touch screen controller 195 may detect a value (e.g., a current value) which is output from the touch screen 190, and may identify a distance between a space, in which the hovering event occurs, and the touch screen 190. Also, the touch screen controller 195 may convert the value of the identified distance into a digital signal (e.g., a Z coordinate), and may provide the digital signal to the controller 110.

Figure 2:
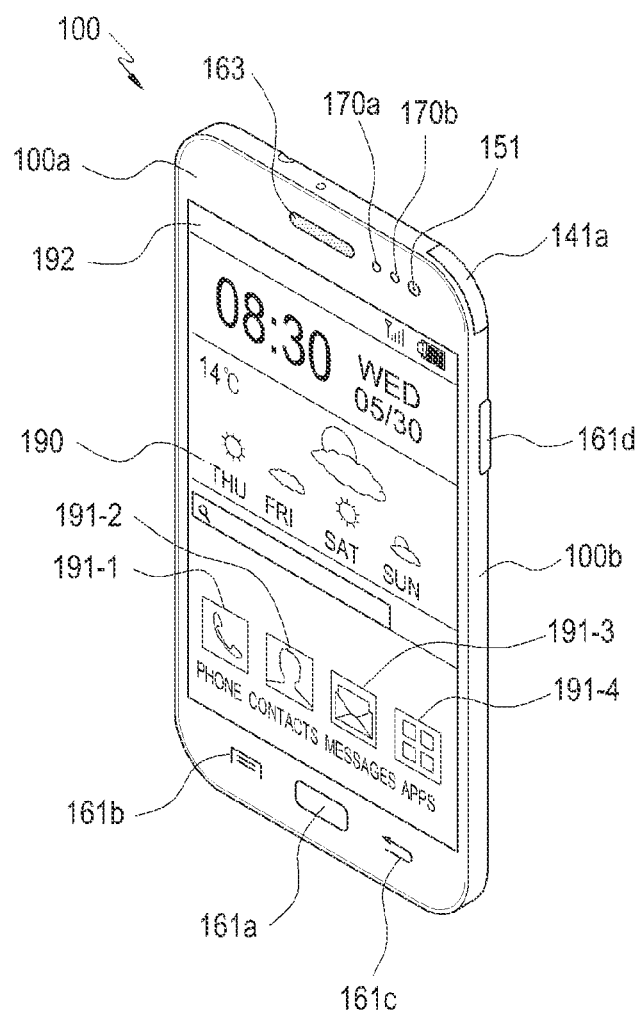
FIG. 2 is a front perspective view of a portable terminal according to an embodiment of the present invention.
Figure 3:
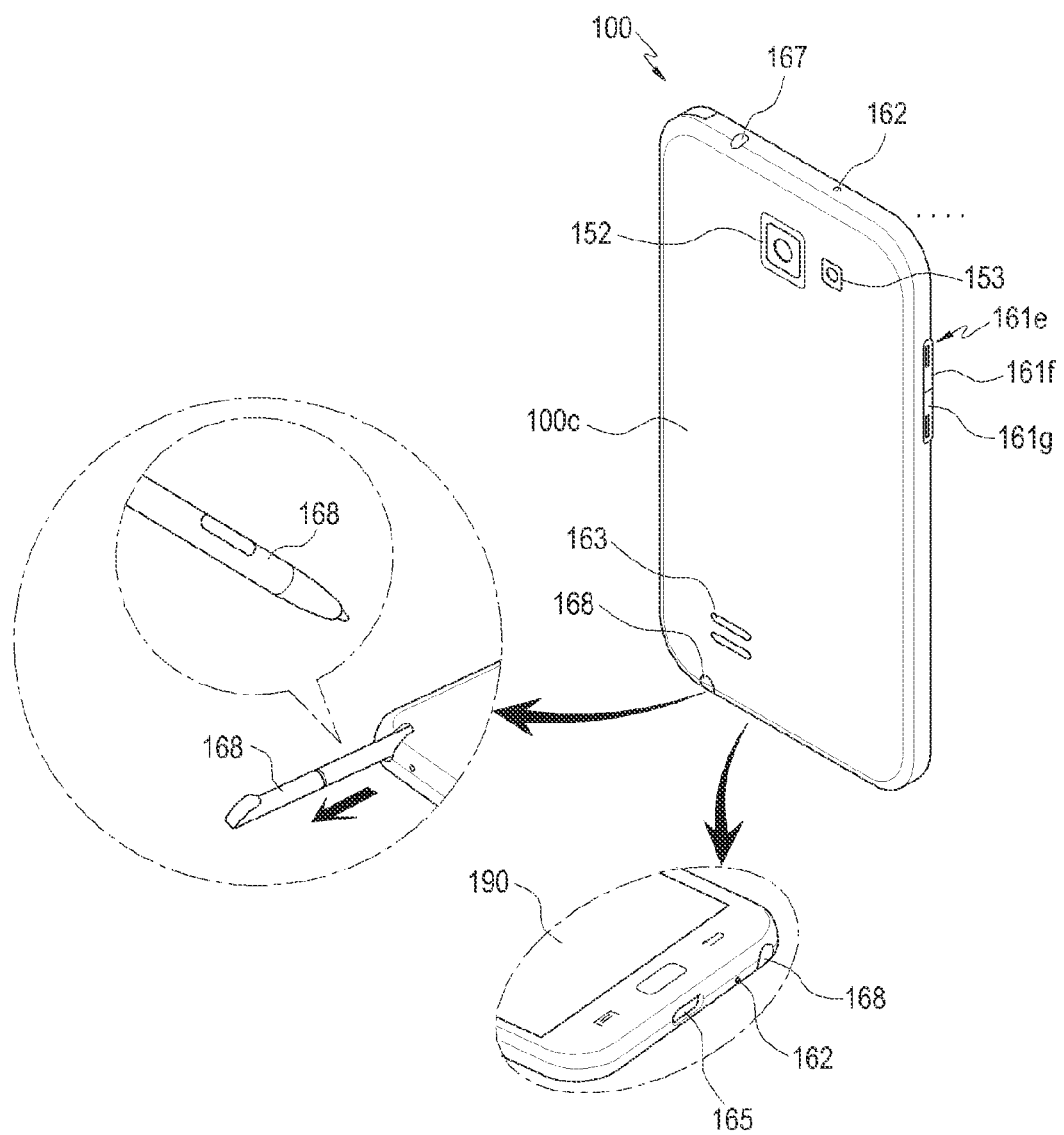
FIG. 3 is a rear perspective view of a portable terminal according to an embodiment of the present invention.

FIG. 2 is a frontal perspective of a portable terminal according to an embodiment of the present invention. FIG. 3 is a rear perspective of a portable terminal according to an embodiment of the present invention.

Referring to FIGS. 2 and 3, the touch screen 190 is disposed in the center of a front surface 100a of the portable terminal 100. The touch screen 190 is largely formed so as to occupy most of the front surface 100a of the portable terminal 100. FIG. 2 is a view illustrating an example of displaying a main home screen on the touch screen 190. The main home screen is the first screen displayed on the touch screen 190 when the portable terminal 100 is turned on. Also, when the portable terminal 100 has different home screens having multiple pages, the main home screen may be the first home screen from among the multi-page home screens. Referring to FIG. 2, shortcut icons 191-1, 191-2 and 191-3 for executing frequently-used applications, a main menu switch key 191-4, time, weather and the like are displayed on the home screen. The main menu switch key 191-4 is used to display a menu screen on the touch screen 190. Also, a status bar 192 which indicates the status of the portable terminal 100, such as a battery charging status, the strength of a received signal, current time, and the like, may be disposed at an uppermost part of the touch screen 190.

A home button 161a, a menu button 161b and a back button 161c may be disposed at a lower part of the touch screen 190.

The home button 161a is used to display the main home screen on the touch screen 190. For example, the main home screen is displayed on the touch screen 190 when the home button 161a is touched in a state of displaying a home screen different from the main home screen or the menu screen on the touch screen 190. When the home button 161a is touched on the touch screen 190 during execution of applications, the main home screen illustrated in FIG. 2 is displayed on the touch screen 190. Also, the home button 161a may be used to display recently-used applications on the touch screen 190 or may be used to display a task manager.

The menu button 161b provides a connection menu which can be used on the touch screen 190. The connection menu may include a widget addition menu, a background screen change menu, a search menu, an edit menu, an environment setup menu, and the like.

The back button 161c may be used to display a screen displayed just before a currently-displayed screen, or may be used to terminate the most recently used application.

The first camera 151, an illuminance sensor 170a and a proximity sensor 170b may be disposed at the edge of the front surface 100a of the portable terminal 100. Referring to FIG. 3, the second camera 152, the flash 153 and the speaker 163 which outputs a voice received from another portable terminal, may be disposed on a rear surface 100c of the portable terminal 100.

Referring to FIGS. 2 and 3 on a lateral surface 100b of the portable terminal 100, for example, a power/reset button 160d, a terrestrial DMB antenna 141a for receiving broadcast signals, the one or multiple microphones 162 and the like may be disposed. The DMB antenna 141a may be formed so as to be fixed to the portable terminal 100, or so as to be removable or detachable from/to the portable terminal 100.

Referring to FIG. 3, a volume control 161e may be disposed on another lateral surface of the portable terminal 100. The volume control 161e may include a volume increase button 161e and a volume decrease button 161g.

Also, the connector 165 is formed on a lateral surface of a lower end of the portable terminal 100. The connector 165 includes multiple electrodes, and is used to connect the mobile device 100 to an external device by wire. The earphone connection jack 167 may be formed on a lateral surface of an upper end of the portable terminal 100. A plug of an earphone may be inserted into the earphone connection jack 167.

Also, the input unit 168 may be formed on a lateral surface of a lower end of the portable terminal 100. The input unit 168 is inserted into the inside of the portable terminal 100, and is kept in the portable terminal 100. When the input unit 168 is used, the input unit 168 is drawn and detached from the portable terminal 100.

Figure 4:
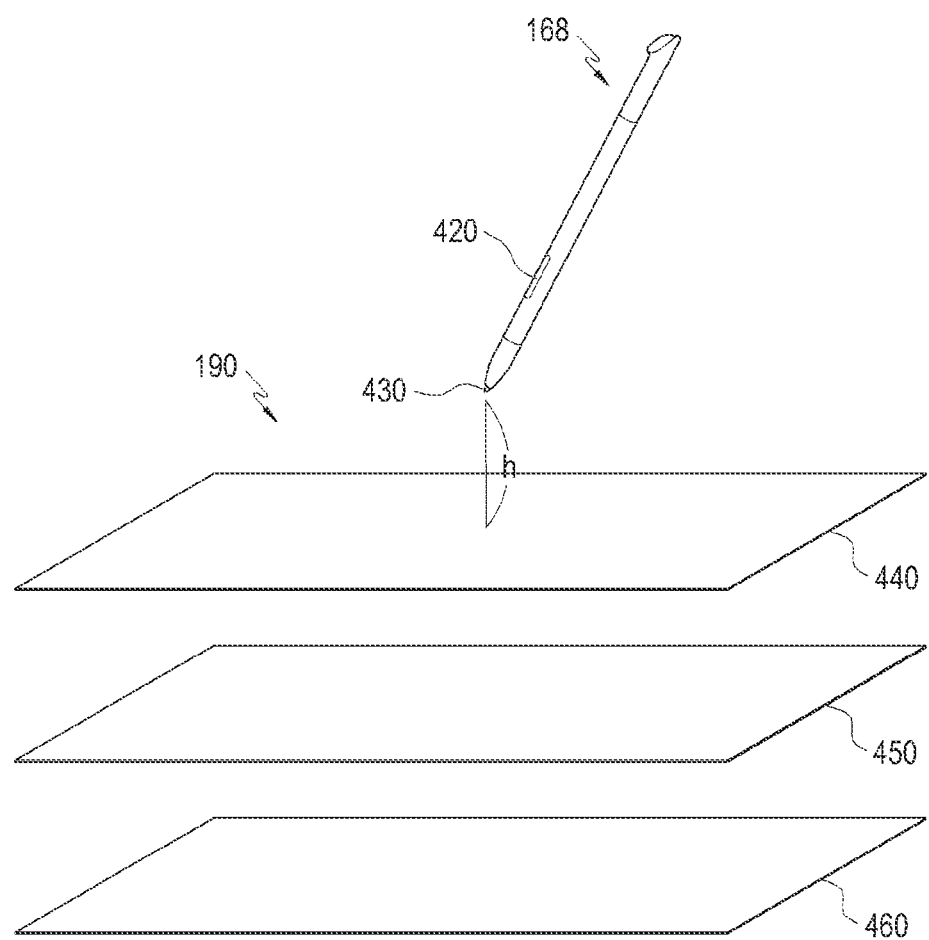
FIG. 4 illustrates an input unit and an internal cross-sectional view of a touch screen, according to an embodiment of the present invention.

FIG. 4 illustrates an input unit and an internal cross-sectional view of a touch screen, according to an embodiment of the present invention.

Referring to FIG. 4, according to an embodiment of the present invention, the touch screen 190 may include a first touch panel 440, a display panel 450, and a second touch panel 460. According to another embodiment of the present invention, the touch screen 190 may include only the display panel 450.

The display panel 450 displays various operational states of the portable terminal 100; various images according to the execution of an application, services, and the like; and multiple objects. Examples of the display panel 450 may include panels such as an LCD panel, an Active Matrix Organic Light-Emitting Diode (AMOLED) panel, and the like.

The first touch panel 440 is a capacitive touch panel. In the first touch panel 440, both sides of a glass panel are coated with a transparent and conductive metal material (e.g., an Indium Tin Oxide (ITO) film, etc.) and an electrical current flows on the surface of the glass, and are coated with a dielectric material capable of storing electrical charges. When a user's finger touches the surface of the first touch panel 440, static electricity causes a predetermined amount of electrical charge to move to a touched position, and the first touch panel 440 recognizes the amount of current change which is caused by the movement of the predetermined amount of electrical charge, and senses the touched position. The first touch panel 440 can sense all touches capable of generating static electricity.

The second touch panel 460 which is an Electromagnetic Resonance (EMR) type-touch panel, includes an electromagnetic induction coil sensor having a grid structure in which multiple loop coils are respectively disposed in a predetermined first direction and in a second direction perpendicular to the first direction; and an electronic signal processing unit which sequentially provides an Alternating Current (AC) signal having a predetermined frequency to each loop coil of the electromagnetic induction coil sensor. When the input unit 168 having a built-in resonant circuit exists near a loop coil of the second touch panel 460, a magnetic field that a relevant loop coil transmits causes the resonant circuit within the input unit 168 to generate an electrical current which is based on mutual electromagnetic induction. Based on the generated electrical current, an induction magnetic field is generated by a coil included in the resonant circuit within the input unit 168. Then, the second touch panel 460 detects the generated induction magnetic field through a loop coil which is in a state of receiving a signal, and senses a hovering position of the input unit 168 and a touch position of the input unit 168. Accordingly, the portable terminal 100 senses a height h from the first touch panel 440 to a nib 430 of the input unit 168. It will be readily understood by those skilled in the art that the height h from the first touch panel 440 of the touch screen 190 to the nib 430 may change depending on the performance or structure of the portable terminal 100. The second touch panel 460 can sense the hovering or touch of an input unit capable of generating an electrical current which is based on electromagnetic induction. The second touch panel 460 will be described as being exclusively used to sense the hovering and touch of the input unit 168. The input unit 168 may be referred to as an "electromagnetic pen" or "EMR pen." Also, the input unit 168 may differ from a typical pen which does not include a resonant circuit and which the first touch panel 440 senses. The input unit 168 may include a button 420 capable of changing the value of electromagnetic induction generated by a coil disposed within an input unit in an area adjacent to the nib 430. The input unit 168 will be described in detail below with reference to FIG. 5.

In the present example, the touch screen controller 195 may include a first touch panel controller and a second touch panel controller. The first touch panel controller converts an analog signal received from the first touch panel 440 through the detection of a finger into a digital signal (e.g., X, Y and Z coordinates), and provides the digital signal to the controller 110. The second touch panel controller converts an analog signal received from the second touch panel 460 through the detection of the hovering or touch of the input unit 168 into a digital signal, and provides the digital signal to the controller 110. Then, the controller 110 controls the first touch panel 440, a display panel 450 and the second touch panel 460 by using the digital signals received, respectively, from the first touch panel controller and the second touch panel controller. For example, the controller 110 controls the display panel 450 to display a screen of a predetermined form in response to the hovering or touch of a finger, a pen, the input unit 168, or the like.

Accordingly, in the portable terminal 100 according to an embodiment of the present invention, the first touch panel senses the touch of the user's finger or the pen, and the second touch panel senses the hovering or touch of the input unit 168. Accordingly, the controller 110 of the portable terminal 100 senses the touch of the user's finger or the pen and the hovering or touch of the input unit 168 by distinguishing the former from the latter. Although only one touch screen is illustrated in FIG. 4, various embodiments of the present invention are not limited to one touch screen, but may include multiple touch screens. Also, the touch screens may be installed in housings and may be connected to the housings by hinge connections, respectively. Alternatively, the multiple touch screens may be installed in one housing. Further, each of the multiple touch screens may include a display panel and at least one touch panel, as illustrated in FIG. 4.

Figure 5:
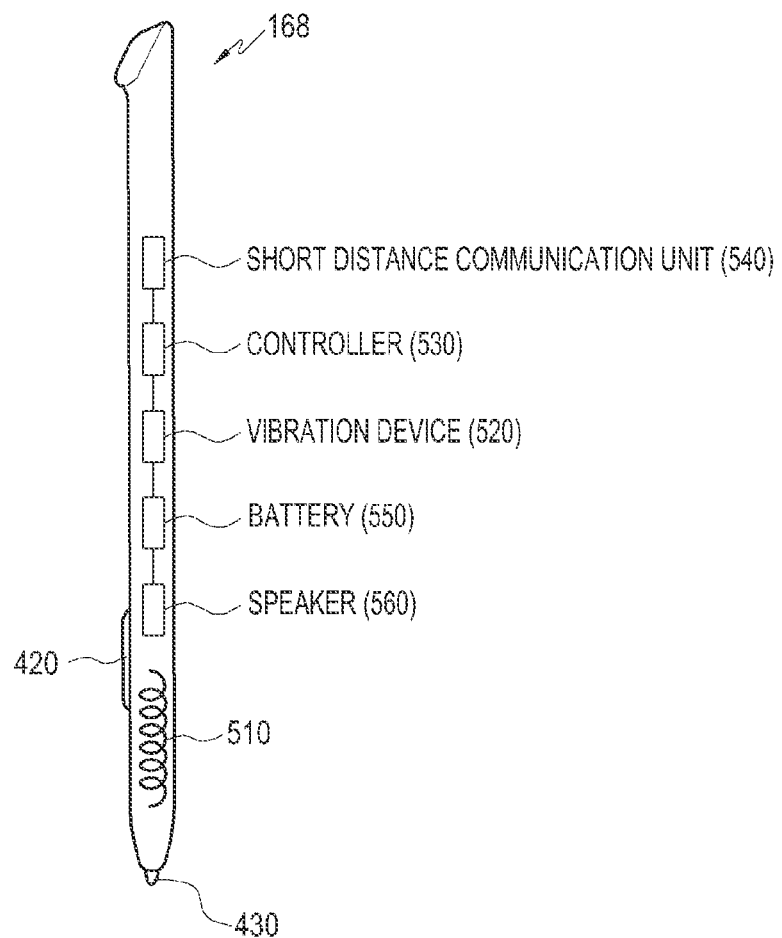
FIG. 5 is a diagram illustrating a configuration of an input unit according to an embodiment of the present invention.

FIG. 5 is a block diagram illustrating a configuration of an input unit according to an embodiment of the present invention.

Referring to FIG. 5, the input unit (e.g., a touch pen) 168 according to an embodiment of the present invention includes the nib 430 disposed at the end of the input unit; the button 420 capable of changing the value of electromagnetic induction generated by the coil 510 disposed within the input unit in an area adjacent to the nib 430; a vibration device 520 which vibrates when a hovering input effect is generated; a controller 530 which analyzes a control signal received from the portable terminal 100 due to hovering between the input unit 168 and the portable terminal 100, and which controls the strength and cycle of vibration of the vibration element 520 in order to provide a haptic effect to the input unit 168, according to a result of the analysis of the control signal; a short-distance communication unit 540 which performs short-range wireless communication with the portable terminal 100; and a battery 550 which supplies power causing the input unit 168 to vibrate. Also, the input unit 168 may include a speaker 560 which outputs a sound matched to the cycle and/or strength of vibration of the input unit 168.

The input unit 168 as configured above has a configuration which supports an electromagnetic induction scheme. The touch screen 190 is configured to detect a position of a magnetic field, formed by the coil 510 at a certain point of the touch screen 190, and to recognize a touch point.

More specifically, according to the control of the controller 530, the speaker 560 outputs sounds matched to various signals (e.g., a wireless signal, a broadcast signal, a digital audio file, and a digital moving image file) from the mobile communication module 120, the sub-communication module 130 and the multimedia module 140 which are included in the portable terminal 100. Also, the speaker 560 outputs a sound (e.g., a button operation sound or a ring back tone matched to a telephone call) matched to a function that the portable terminal 100 performs. The input unit 168 may include multiple speakers. The speaker 560 or the multiple speakers may be disposed at an appropriate position or positions of a housing of the input unit 168.

Figure 6:
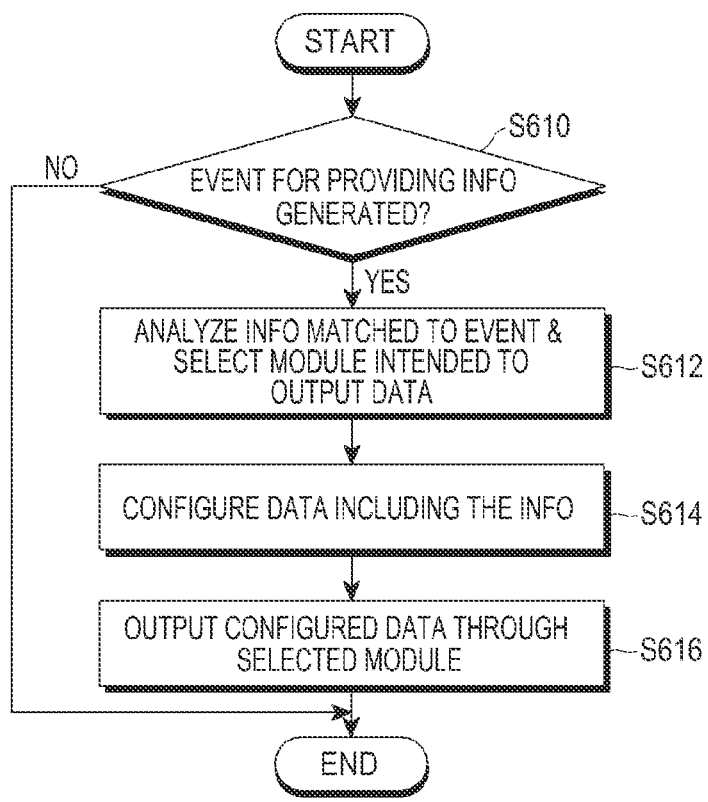
FIG. 6 is a flowchart illustrating a method for providing data by a portable terminal, according to an embodiment of the present invention.

FIG. 6 is a flowchart illustrating a method for providing data by a portable terminal, according to an embodiment of the present invention.

When an event for providing information is generated in step S610, the controller analyzes information matched to the generated event and selects a module intended to output data, in step S612. When an event required to be provided to a user is generated, the controller senses the generation of the event, analyzes information included in the generated event, and selects a module intended to output a result of the analysis of the information. The controller extracts a keyword from the received or generated data, and analyzes the information included in the generated event. The event is used to give notice to the user, and may include at least one of the receipt of an e-mail, the reception of a text message, the generation of a shortage of battery residual quantity and the receipt of a call. Also, the multiple modules may exist depending on the type of generated event. Examples of the modules may include an e-mail transmission/reception module; a text message transmission/reception module; a module which notifies the user of a shortage of battery residual quantity through a pop-up, a voice call, a message, and the like in the case of the shortage of battery residual quantity; and a call module which provides a voice call or a video call. The controller analyzes information in response to an event received through each of the modules. The information which is required to be provided to the user, includes a keyword. Then, under the control of the controller, the selected module provides the user with data configured to be anthropomorphized for a response to a request that the user has input. Also, the module which serves to communicate with the user, performs an operation for at least one of a voice call, a video call, a text message, a pop-up window and an e-mail.

The portable terminal according to an embodiment of the present invention configures data in step S614, including the information in response to the module selected in step S612. The controller controls the selected module to provide the user with the data configured to be anthropomorphized through the selected module. The controller selects the module for providing data to the user based on the result of the analysis, in step S612. The portable terminal includes an artificial intelligence engine, and the user can not only communicate with the artificial intelligence engine but also can transmit/receive data to/from the artificial intelligence engine. In order to provide communication between the artificial intelligence engine and the user, the artificial intelligence engine can configure data, which is to be provided to the user, so as to be anthropomorphized. The anthropomorphization (or personification) enables the portable terminal to communicate with the user of the portable terminal as if the portable terminal were a living person (e.g., a virtual user). The anthropomorphization enables the portable terminal corresponding to a virtual user to provide data to the user by using a voice and the like. The portable terminal includes multiple modules for providing information or data to the user. When the user inputs a request for information through the selected module, the controller configures data corresponding to a response to the input request. The configured data is configured to be provided to the user by using an extracted keyword. For example, when the controller intends to provide information to the user through a voice call, the controller extracts a keyword in response to the received event, and generates voice data by using the extracted keyword. The voice data is formed by using the extracted keyword and is output to the user through the speaker. The user listens to the formed voice data, and thereby can understand the contents of the received event. Otherwise, when the controller intends to provide information to the user through a video call, the controller generates voice data as in the case where information is intended to be provided to the user through the voice call, and provides a video call between the artificial intelligence engine and the user through an emoticon or icon given to the artificial intelligence engine. Otherwise, when the controller intends to provide information to the user through a message, the controller extracts a keyword in response to the received event, and generates text data by using the extracted keyword. When a picture file exists in the received event, the text data is generated in such a manner as to add the picture file to the text data. As described above, the artificial intelligence engine uses a context awareness module to communicate with the user through a text message, a voice call or a video call. As described above, the artificial intelligence engine which can be anthropomorphized enables the user to receive an effect such that the user communicates with a virtual person as if the virtual person were a living person. Also, the artificial intelligence engine receives, as input, a request for information from the user, and configures data including a response corresponding to an analyzed request. Specifically, the artificial intelligence engine analyzes contents that the user has requested, and configures data corresponding to the response to the contents the user has requested, by using a pre-stored data in the portable terminal. If the portable terminal does not store data corresponding to the response of the request, the portable terminal requests the data corresponding to the response of the request, to the server, and configures data by using a response to the contents that the user has requested. Pre-stored data is stored in the portable terminal. If the portable terminal does not store data corresponding to the response to the request, the portable terminal requests the data corresponding to the response to the request, to the server, and receives the data from the server. In other words, the artificial intelligence engine extracts the response to the analyzed request from information pre-stored in the portable terminal, or receives the response to the analyzed request from the server which stores information matched to the analyzed request, and provides the response to the analyzed request, to the user. The artificial intelligence engine configures data so as to anthropomorphize the response to the request by using a voice, an image or a message and provide the anthropomorphized response to the user.

The portable terminal according to an embodiment of the present invention outputs the data configured in step S614 through the selected module in step S616. When an event is the receipt of an e-mail or the receipt of a text message, the controller extracts at least one of a keyword and a picture included in the received e-mail or text message, configures data by using the extracted keyword and/or picture, and provides the configured data to the user through at least one of a voice call, a video call and a pop-up window. Alternatively, when an event is the generation of a shortage of battery residual quantity of the portable terminal, the controller extracts the residual quantity of the battery, configures data, and provides the configured data to the user through at least one of a voice call, a video call and a pop-up window. Further, when an event is the reception of a call, the controller configures data in response to the extraction of at least one of the name of a user who has transmitted the call, and a telephone number of a portable terminal which has transmitted the call. The controller then provides the configured data to the user through at least one of a voice call, a video call and a pop-up window.

Figure 7:
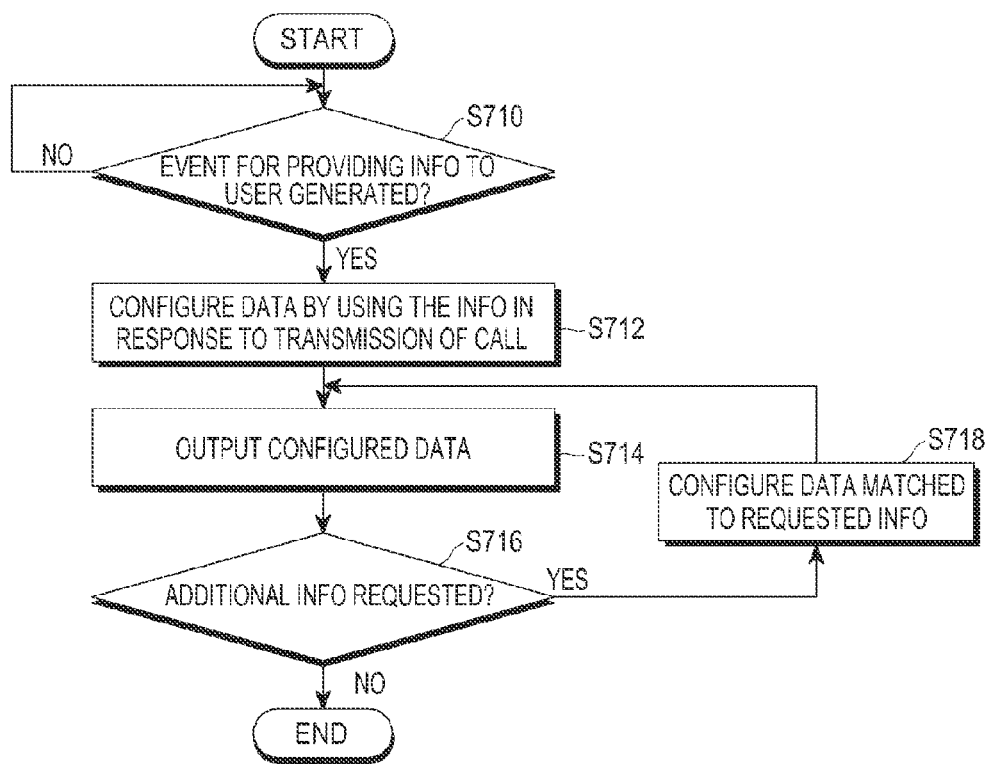
FIG. 7 is a flowchart illustrating a method for providing data by using a telephone call when an event is generated in a portable terminal, according to an embodiment of the present invention.

FIG. 7 is a flowchart illustrating a method for providing data by using a telephone call when an event is generated in a portable terminal, according to an embodiment of the present invention.

When an event for providing information to a user is generated in step S710, the portable terminal according to an embodiment of the present invention transmits a call to the user. When the portable terminal identifies that the user receives the call, the portable terminal configures data by using information in step S712. When an event required to be provided to the user is generated, the controller senses the generation of the event, analyzes information included in the generated event, and selects a module intended to output a result of the analysis of the information. The event is used to give notice to the user, and may include at least one of the reception of an e-mail, the reception of a text message, the generation of a shortage of battery residual quantity and the reception of a call. Also, the multiple modules may exist depending on the type of generated event. Specifically, examples of the multiple modules include an e-mail transmission/reception module; a text message transmission/reception module; a module which notifies the user of a shortage of battery residual quantity through a pop-up, a voice call, a message, and the like in the case of the shortage of battery residual quantity; and a call module which provides a voice call or a video call. Also, there are multiple modules, each of which is intended to output the result of the analysis of information to the user. Examples of the multiple modules include a module which performs an operation for a voice call or a video call. In one example, the controller may analyze information included in the event, and may transmit a call to the user. In another example, when an event is received, the controller may transmit a call to the user, and may analyze information included in the event.

As described above, the controller may use an artificial intelligence engine to transmit a call to the user and output the result of the analysis. The artificial intelligence engine is capable of not only communicating with the user, but also is capable of transmitting/receiving data. The artificial intelligence engine may be a virtual person installed in the portable terminal.

Then, the controller configures data so as to be anthropomorphized in response to the generation of an event, and may select a module for outputting the configured data to the user. Otherwise, the controller may select a module and may configure data in response to the selection of the module. The module may include a voice call module or a video call module capable of communicating with the user.

The portable terminal according to an embodiment of the present invention outputs in step S714, the data configured in step S712. The controller controls the selected module to output the configured data to the user. When the user inputs a request for information, the controller configures data corresponding to a response to the input request. The configured data is configured to be provided to the user by using the extracted keyword. For example, when the controller intends to provide information to the user through a voice call, the controller extracts a keyword in response to the received event, and generates voice data by using the extracted keyword. The voice data is formed by using the extracted keyword and is output to the user through the speaker. The user listens to the formed voice data, and thereby can understand the contents of the received event. Alternatively, when the controller intends to provide information to the user through a video call, the controller generates voice data as in the case where information is intended to be provided to the user through the voice call, and provides a video call between the artificial intelligence engine and the user through an emoticon or icon given to the artificial intelligence engine. As described above, the artificial intelligence engine, which can be anthropomorphized, enables the user to receive an effect such that the user communicates with a virtual person as if the virtual person were a living person. Also, the artificial intelligence engine receives, as input, a request for information from the user, and configures data including a response corresponding to an analyzed request. Specifically, the artificial intelligence engine analyzes contents that the user has requested, and configures data corresponding to the response to the contents the user has requested, by using pre-stored data in the portable terminal. If the portable terminal does not store data corresponding to the response to the request, the portable terminal requests the data corresponding to the response to the request, to the server, and configures data by using a response to the contents that the user has requested. In other words, artificial intelligence engine extracts the response to the analyzed request from information pre-stored in the portable terminal, or receives the response to the analyzed request from the server which stores information matched to the analyzed request, and provides the response to the analyzed request, to the user. The artificial intelligence engine configures data so as to provide a response to the request to the user, as a voice, a image or a message.

After the configured data is output in step S714, the portable terminal checks to see if additional information is requested in step S716. If so, data is configured to match the requested information in step S718, and then the process returns to step S714. If not, the process ends.

Hereinafter, an example in which the portable terminal performs a voice call or video call with the user through the artificial intelligence engine will be described with reference to FIG. 8.

Figure 8:
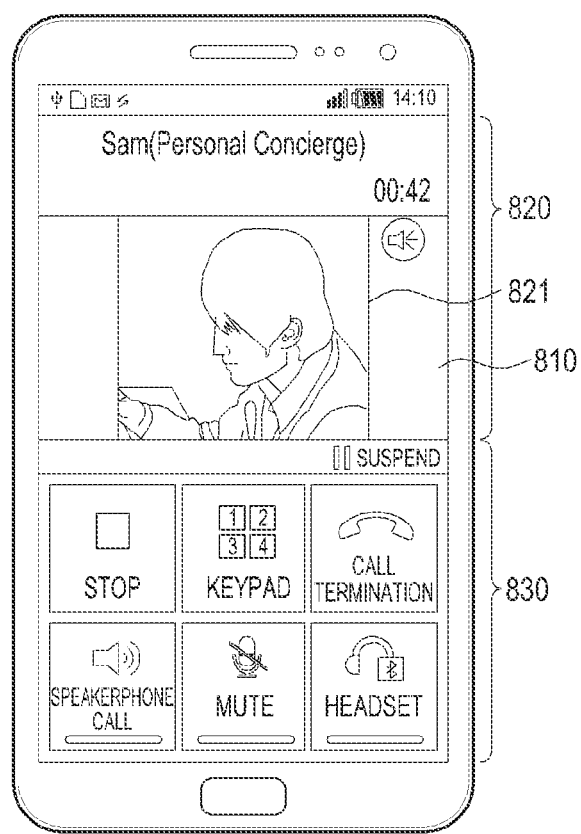
FIG. 8 is a screen view illustrating an example of providing data by using a telephone call when an event is generated in a portable terminal according to an embodiment of the present invention.

FIG. 8 is a view illustrating an example of providing data to a user by using a telephone call when an event is generated in a portable terminal according to an embodiment of the present invention. In an example illustrated in FIG. 8, the artificial intelligence engine of the portable terminal can perform a telephone call with the user.

In an embodiment of the present invention, an example of a telephone call between the user of the portable terminal and the artificial intelligence engine included in the portable terminal is described with reference to FIG. 8. When at least one event is generated among the receipt of an e-mail, the reception of a text message, the generation of a shortage of battery residual quantity and the receipt of a call, the artificial intelligence engine may be activated. Otherwise, the artificial intelligence engine may be activated by the user's selection. The artificial intelligence engine may be a virtual person installed in the portable terminal, which can communicate with the user of the portable terminal or which can transmit/receive data to/from the user of the portable terminal. In other words, the user is capable of not only naturally communicating with the virtual person, but is also capable of transmitting/receiving data to/from the virtual person. The artificial intelligence engine is assigned a unique telephone number, and is activated when the user calls up the assigned telephone number. The artificial intelligence engine is capable of not only communicating with the user, but is also capable of transmitting/receiving data to/from the user, through a transmission/reception unit. The transmission/reception unit includes at least one of the touch screen, the microphone, the speaker and the earphones, which are included on the portable terminal. When the above-described event is generated while the controller performs a control operation, the artificial intelligence engine analyzes the reception of information matched to the event or the generated information, and selects a module for providing a result of the analysis of the information. Then, the artificial intelligence engine configures data including the result of the analysis of the information, through the selected module. Also, the artificial intelligence engine receives a request for information from the user through the selected module.

Referring to FIG. 8, a touch screen 810 of the portable terminal includes a lower part screen 830 on which buttons are disposed which are respectively matched to multiple functions capable of being provided during a telephone call; and an upper part screen 820 which displays the name of a person with whom the user talks a the telephone call, the length of time of a telephone call, and the image of the other party of a telephone call or an emoticon. When an event is received or is generated, the artificial intelligence engine is activated, and analyzes information on the event. Specifically, the artificial intelligence engine detects whether the event is the receipt of an e-mail, the reception of a text message, or the receipt of a call from another portable terminal. Also, the artificial intelligence engine may detect that the event corresponds to a case in which a battery residual quantity of the portable terminal becomes less than a predetermined threshold. Because the artificial intelligence engine is assigned a unique telephone number, the user may activate the artificial intelligence engine by using the assigned telephone number. When the user uses the assigned telephone number to call up the artificial intelligence engine, the artificial intelligence engine activates an icon, an emoticon or a photograph, which is assigned to itself or is optional, and displays the activated icon, emoticon or photograph on the upper part screen 820. FIG. 8 illustrates a telephone call between the user and the artificial intelligence engine. As illustrated in FIG. 8, the artificial intelligence engine causes a photograph 821 to be displayed on the upper part screen 820, and performs a video call. A voice of the artificial intelligence engine may be set as a voice of the user of the portable terminal. Otherwise, the voice of the artificial intelligence engine may be set as voices of various persons, such as voice actors (or voice actresses), actors (or actresses) and singers. The telephone call enables the user to input information into the artificial intelligence engine or send a request for information to the artificial intelligence engine. When the user inputs information or makes a request for information through a telephone call, the artificial intelligence engine analyzes the input information or the request for the information and determines whether the artificial intelligence engine can provide a response to the request by using information pre-stored in the portable terminal, or whether the artificial intelligence engine needs to provide the response to the request after the artificial intelligence engine connects to a separate server and receives information on the response. According to a result of the determination, the artificial intelligence engine configures data corresponding to the response, and may output the configured data to the user through the speaker or earphones or may output the configured data to the user through the touch screen. In another example, the artificial intelligence engine may connect to a server which stores an answer to the request, may receive data from the server, and may configure the received data to be provided to the user.

Referring back to FIG. 7, when the user requests additional information, the portable terminal according to an embodiment of the present invention configures data matched to the requested additional information and outputs the configured data to the user, in steps S716, S718 and S714. When the portable terminal receives a request for additional information from the user after the configured data is output to the user in step S714, the portable terminal configures data including a response to the requested additional information, and again outputs the configured data to the user. When an input corresponding to an additional request is received from the user, the controller obtains a response to the request by using data pre-stored in the portable terminal, or by performing a control operation for connecting to a server matched to the request. The pre-stored data includes information which is displayed on the touch screen of the portable terminal or which is obtained through a web page. Also, examples of the server may include servers according to various contents, such as a server of the Meteorological Office which provides weather information according to a user's inquiry, a location-based server which provides a location, and the like.

Figure 9:
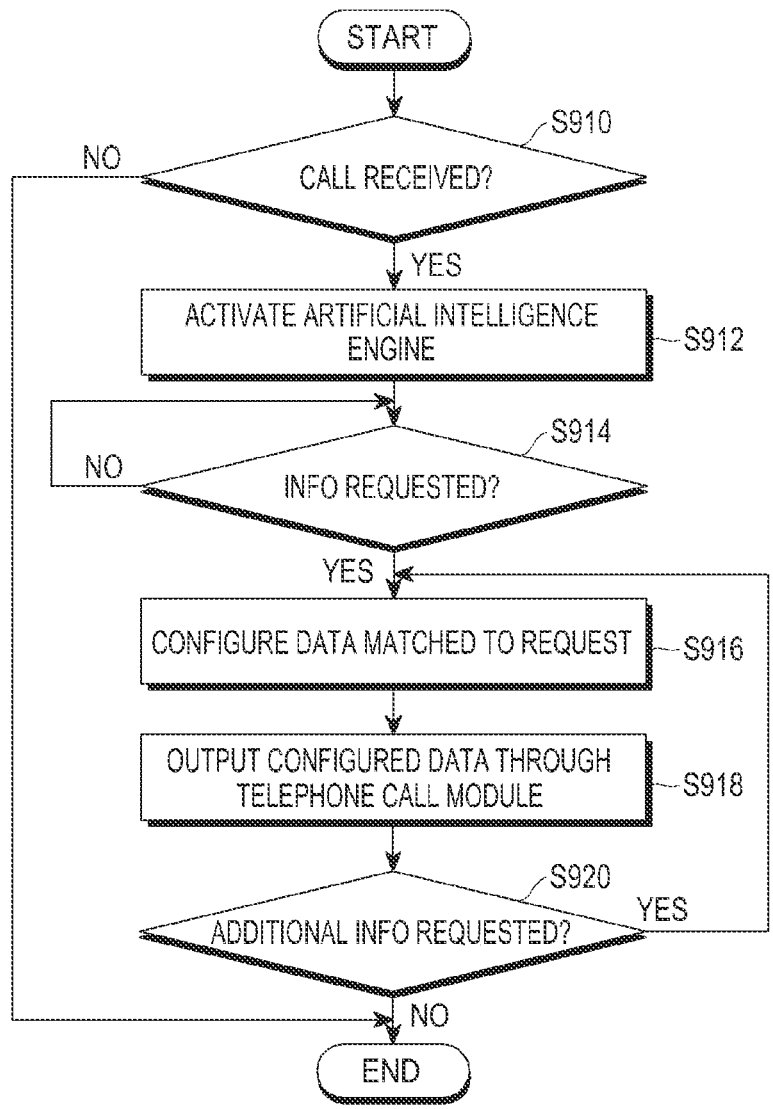
FIG. 9 is a flowchart illustrating a method for providing data when a portable terminal receives a call, according to an embodiment of the present invention.

FIG. 9 is a flowchart illustrating a method for providing data when a portable terminal receives a call, according to an embodiment of the present invention.

When a call is received in step S910, the portable terminal according to an embodiment of the present invention activates the artificial intelligence engine in step S912. When a user requires necessary information, the user activates the artificial intelligence engine of the portable terminal, and obtains the necessary information. The artificial intelligence engine may be configured as a virtual person, and a separate telephone number, a separate name, and the like may be set for the virtual person. When the user calls up the name or makes a telephone call to the telephone number, the artificial intelligence engine is activated, and the portable terminal communicates with the user through the activated artificial intelligence engine. As described above, when a call is received from the user at the assigned telephone number, the controller activates the artificial intelligence engine. The portable terminal is capable of not only communicating with the user but is also capable of transmitting/receiving data, through the activated artificial intelligence engine. Specifically, the user communicates with the artificial intelligence engine through a voice call, a video call or a text message, and the artificial intelligence engine analyzes a voice, an image or a text message, which has been received as input from the user, and determines which information the user desires.

When a request for information is received in step S914, the portable terminal according to an embodiment of the present invention configures data matched to the request and outputs the configured data through a telephone call module, in steps S916 and S918. The artificial intelligence engine determines whether the information that the user has requested is pre-stored in the portable terminal. When it is determined that the information that the user has requested is pre-stored in the portable terminal, the portable terminal configures data including a response to the request. In contrast, when it is determined that the information that the user has requested is not pre-stored in the portable terminal, the portable terminal requests a server to provide a response to the request, receives a response to the request from the server, and configures data by using the received response. Then, the configured data is configured to be provided to the user by using an extracted keyword. For example, when the controller intends to provide information to the user through a voice call, the controller extracts a keyword in response to the received event, and generates voice data by using the extracted keyword. The voice data is formed by using the extracted keyword and is output to the user through the speaker. The user listens to the formed voice data, and thereby can understand the contents of the received event. Alternatively, when the controller intends to provide information to the user through a video call, the controller generates voice data, as in the case where information is intended to be provided to the user through the voice call, and provides a video call between the artificial intelligence engine and the user through an emoticon or icon given to the artificial intelligence engine. As described above, the artificial intelligence engine which can be anthropomorphized enables the user to receive an effect such that the user communicates with a virtual person as if the virtual person were a living person. Also, the artificial intelligence engine receives, as input, a request for information from the user, and configures data including a response corresponding to an analyzed request. Specifically, the artificial intelligence engine analyzes contents that the user has requested, and configures data corresponding to the response to the contents the user has requested, by using pre-stored data in the portable terminal. If the portable terminal does not store data corresponding to the response to the request, the portable terminal requests the data corresponding to the response to the request, to the server, and configures data by using a response to the contents that the user has requested. In other words, the artificial intelligence engine extracts the response to the analyzed request from information pre-stored in the portable terminal, or receives the response to the analyzed request from the server which stores information matched to the analyzed request, and provides the response to the analyzed request to the user. The artificial intelligence engine configures data so as to provide a response to the request to the user, as a voice, a image or a message. In the present example, the configured data may be configured to be different for each module. In other words, when the user makes a request for receiving the response to the request as a text message, the artificial intelligence engine configures data as a text message. When the user makes a request for receiving the response to the request as a voice call, the artificial intelligence engine configures data as a voice. When the artificial intelligence engine configures data, the artificial intelligence engine can configure the data in such a manner as to set itself as a subject that provides information.

When the user requests additional information in step S920, the controller configures data matched to the request, in step S916. When a request for additional information is received from the user after the configured data is output to the user in step S918, the controller configures data including a response to the requested additional information, and again outputs the configured data to the user. When an input corresponding to an additional request is received from the user, the controller obtains a response to the request by using data pre-stored in the portable terminal, or by performing a control operation for connecting to a server matched to the request. The pre-stored data includes information which is displayed on the touch screen of the portable terminal or which is obtained through a web page. Also, examples of the server may include servers according to various contents, such as a server of the Meteorological Office which provides weather information according to a user's inquiry, a location-based server which provides a location, and the like.

Figure 10:
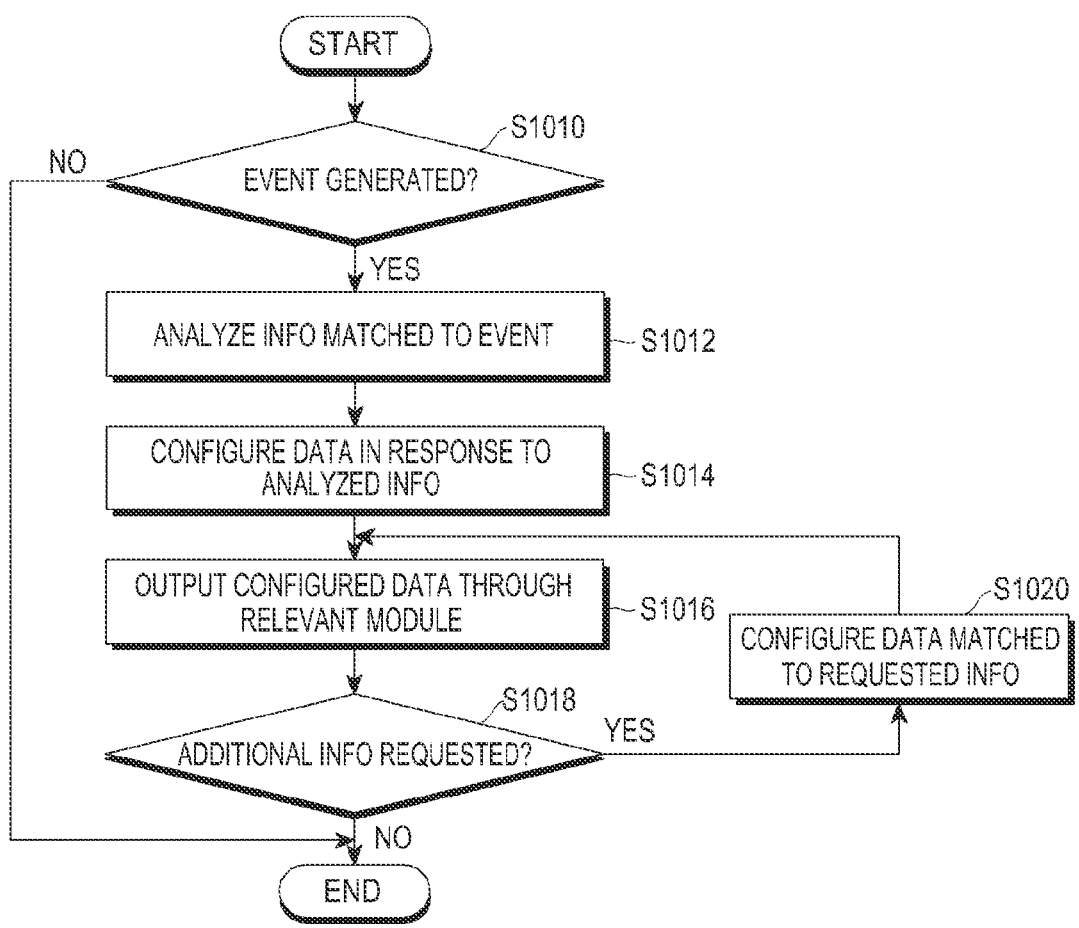
FIG. 10 is a flowchart illustrating a method for providing data through a module matched to a generated event when the event is generated in a portable terminal, according to an embodiment of the present invention.

FIG. 10 is a flowchart illustrating a method for providing data through a module matched to a generated event when the event is generated in a portable terminal, according to an embodiment of the present invention.

When an event is generated in step S1010, the controller analyzes information matched to the generated event, in step S1012. When an event required to be provided to a user is generated, the controller senses the generation of the event, analyzes information included in the generated event, and configures data, which is intended to be provided to the user, in response to a result of the analysis of the information. The controller extracts a keyword from data matched to the received or generated event, and analyzes the information by using the extracted keyword. The information is data required to be provided to the user. The event is used to notify the user of information with which a sender intends to provide the user, and may include at least one of the reception of an e-mail, the receipt of a text message and the receipt of a call. Also, the event includes a pop-up window or the transmission of a call for notifying of a shortage of battery residual quantity of the portable terminal. The information includes a keyword required to be provided to the user. In the present example, the controller performs a control operation for anthropomorphizing data configured for a response to a request that the user has input, and for providing the anthropomorphized data to the user. The module which serves to communicate with the user, performs an operation for at least one of a voice call, a video call, a text message, a pop-up window and an e-mail.

The controller configures data in response to the information, which has been analyzed in step S1012, and controls a relevant module to output the configured data, in steps S1014 and S1016. The controller controls a selected module to anthropomorphize the configured data and provide the anthropomorphized data to the user. The controller selects the module for providing data to the user based on the result of the analysis in step S1012. The multiple modules may exist depending on the type of generated event. Specifically, examples of the multiple modules may include an e-mail transmission/reception module; a text message transmission/reception module; a module which notifies the user of a shortage of battery residual quantity through a pop-up, a voice call, a message, and the like in the case of the shortage of battery residual quantity; and a telephone call module which provides a voice call and a video call. The controller analyzes information in response to an event received through each of the modules. The portable terminal includes the artificial intelligence engine, and the user is capable of not only communicating with the artificial intelligence engine but is also capable of transmitting/receiving data to/from the artificial intelligence engine. The portable terminal includes multiple modules for providing information or data to the user. When the user inputs a request for information through the selected module, the controller configures data corresponding to a response to the input request. The configured data is configured to be provided to the user by using the extracted keyword. For example, when the controller intends to provide information to the user through a text message, the controller extracts a keyword in response to the received event, and generates a text message by using the extracted keyword. The text message is formed by using the extracted keyword, and is output to the user through the touch screen. The user can understand the contents of the received event through the output text message. When the controller intends to provide information to the user through an e-mail, the controller generates an e-mail and provides the generated e-mail to the user, as in the case where the controller intends to provide information to the user through the text message. When a picture file exists in the received event, the text data or e-mail is generated in such a manner as to add the picture file to the text data or e-mail. As described above, the artificial intelligence engine can use a context awareness module to communicate with the user through a text message or an e-mail. Accordingly, the artificial intelligence engine which can be anthropomorphized enables the user to receive an effect such that the user communicates with a virtual person as if the virtual person were a living person. Also, the artificial intelligence engine receives, as input, a request for information from the user, and configures data including a response corresponding to an analyzed request. Specifically, the artificial intelligence engine analyzes contents that the user has requested, and configures data corresponding to the response to the contents the user has requested, by using pre-stored data in the portable terminal. If the portable terminal does not store data corresponding to the response to the request, the portable terminal requests the data corresponding to the response to the request, to the server, and configures data by using a response to the contents that the user has requested. In other words, the artificial intelligence engine extracts the response to the analyzed request from information pre-stored in the portable terminal, or receives the response to the analyzed request from a server which stores information matched to the analyzed request, and provides the response to the analyzed request to the user. The artificial intelligence engine configures data so as to provide the response to the request to the user, as a text message or an e-mail.

When the user requests additional information in step S1018, the controller configures data matched to the requested additional information and controls a relevant module to output the configured data, in steps S1020 and S1016. When the user requests additional information, the controller controls the artificial intelligence engine to analyze the requested information. Then, the controller determines whether a response can be provided to the requested information or an inquiry by the user by using pre-stored data, or whether the controller needs to provide the received response to the user after the controller receives the response from a server. When a request for additional information is received from the user after the configured data is output to the user in step S1016, the controller configures data including a response to the requested additional information, anthropomorphizes the configured data, and again outputs the anthropomorphized data to the user. When an input corresponding to an additional request is received from the user, the controller obtains a response to the request by using data pre-stored in the portable terminal, or by performing a control operation for connecting to a server matched to the request. The pre-stored data includes information which is displayed on the touch screen of the portable terminal or which is obtained through a web page. Also, examples of the server may include servers according to various contents, such as a server of the Meteorological Office which provides weather information according to a user's inquiry, a location-based server which provides a location, and the like.

Figure 11A:
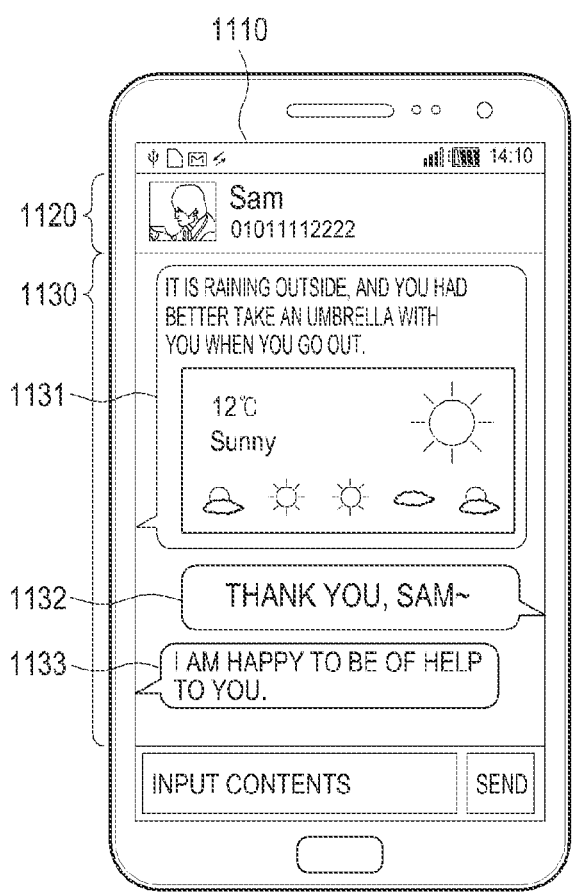
FIG. 11A is a screen view illustrating an example of providing data to a user through a text message when an event is generated in a portable terminal according to an embodiment of the present invention.

FIG. 11A is a view illustrating an example of providing data to a user through a text message when an event is generated in a portable terminal according to an embodiment of the present invention.

In an embodiment of the present invention, an example of the transmission/reception of a text message between the user of the portable terminal and the artificial intelligence engine included in the portable terminal is described with reference to FIG. 11A. When at least one event is generated among the receipt of an e-mail, the receipt of a text message, the generation of a shortage of battery residual quantity and the receipt of a call, the artificial intelligence engine may be activated. Otherwise, the artificial intelligence engine may be activated by the user's selection. In other words, the user is capable of not only naturally communicating with the virtual person, but is also capable of transmitting/receiving data to/from the virtual person. When the above-described event is generated while the controller performs a control operation, the artificial intelligence engine analyzes the receipt of information matched to the event or the generated information, and selects a module for providing a result of the analysis of the information. Then, the artificial intelligence engine configures data including the result of the analysis of the information, through the selected module.

Also, the artificial intelligence engine receives a request for information from the user through the selected module.

A touch screen 1110 of the portable terminal includes an upper screen 1120 which displays an optional character, which is set for a virtual person matched to the artificial intelligence engine, and a telephone number assigned to the virtual person; and a lower screen which displays a text message exchanged between the virtual person and the user. When an event is received or is generated, the artificial intelligence engine is activated, and analyzes information on the event. The artificial intelligence engine then configures data based on a result of the analysis, and outputs the configured data to the user. FIG. 11A illustrates the transmission/reception of a text message between the user and the virtual person of the artificial intelligence engine about weather. The artificial intelligence engine analyzes information on weather based on the received event, configures data to be provided to the user, and outputs the configured data to the lower part screen 1130. The configured data includes information to be provided to the user. For example, when information to be provided to the user is about weather and it is raining, the artificial intelligence engine configures data 1131 which includes the text "It is raining outside, and you had better take an umbrella with you when you go out," and a picture added to the text where applicable. Then, the artificial intelligence engine outputs the configured data to the lower part screen 1130. The user can then input a response (i.e., "Thank you, Sam.") to the configured data 1131. Sam may be a name given to a virtual person, or may be a name given to the artificial intelligence engine. When receiving the response from the user, the artificial intelligence engine understands the expression of the user's gratitude to itself, through the words "Thank you" and "Sam," configures data including an appropriate answer (i.e., "I am happy to be of help to you.") to the expression of the user's gratitude, and outputs the configured data. As described above, the artificial intelligence engine that has received the response 1132 (i.e., "Thank you, Sam.") from the user, again provides the answer 1133 (i.e., "I am happy to be of help to you.") to the response 1132 to the user.

Through the text message, the user may input information 1132 into the artificial intelligence engine or may send a request for information to the artificial intelligence engine. When the user inputs information or makes a request for information through a text message, the artificial intelligence engine analyzes the input information or the request for the information and determines whether the artificial intelligence engine can provide a response to the request by using information pre-stored in the portable terminal, or whether the artificial intelligence engine needs to provide the response to the request after the artificial intelligence engine connects to a separate server and receives information on the response. According to a result of the determination, the artificial intelligence engine configures data corresponding to the response, and may output the configured data to the user through the speaker or earphones, or may output the configured data to the user through the touch screen. In another example, the artificial intelligence engine may connect to a server which stores an answer to the request, may receive data from the server, and may configure the received data as data to be provided to the user.

Figure 11B:
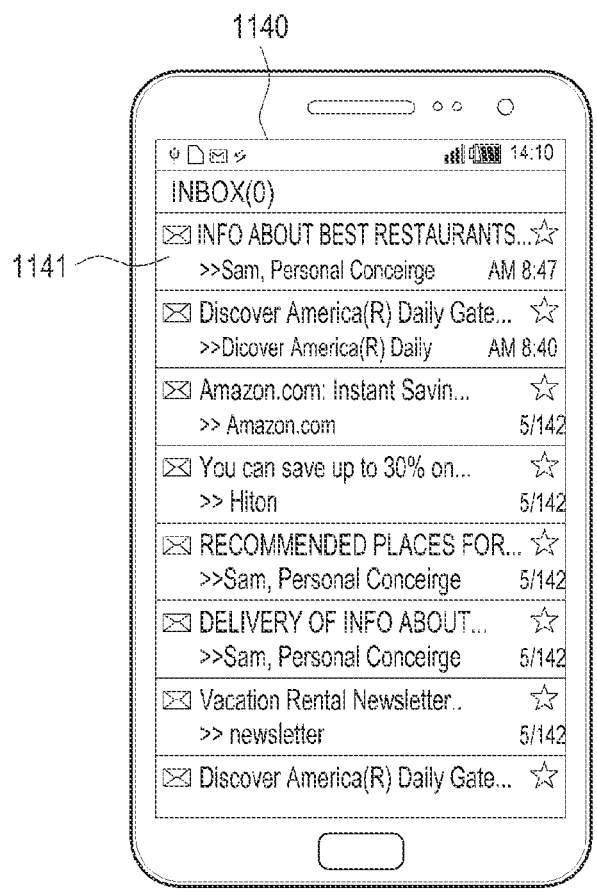
FIG. 11B is a screen view illustrating an example where an event is generated in a portable terminal according to an embodiment of the present invention.
Figure 11C:
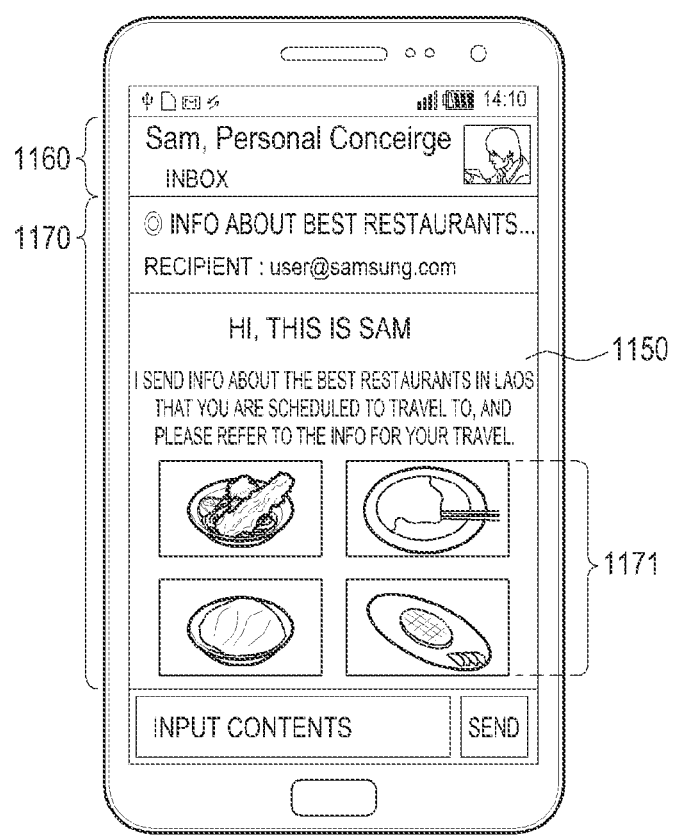
FIG. 11C is a screen view illustrating an example of providing data to a user through an e-mail when an event is generated in a portable terminal according to an embodiment of the present invention.

FIG. 11B illustrates an example in a case where an event is generated in a portable terminal according to an embodiment of the present invention. FIG. 11C is a view illustrating an example of providing data to a user through an e-mail when an event is generated in a portable terminal according to an embodiment of the present invention.

In an embodiment of the present invention, when an e-mail is received, the artificial intelligence engine analyzes the received e-mail; configures a separate e-mail, the sender of which is the artificial intelligence engine itself, or configures a message; and outputs the configured separate e-mail or the configured message to the user. When at least one event is generated among the receipt of an e-mail, the reception of a text message, the generation of a shortage of battery residual quantity and the reception of a call, the artificial intelligence engine may be activated. Otherwise, the artificial intelligence engine may be activated by the user's selection. Specifically, the user can transmit/receive a natural e-mail to/from the virtual person. When the above-described event is generated while the controller performs a control operation, the artificial intelligence engine analyzes the reception of information matched to the event or the generated information, and selects a module for providing a result of the analysis of the information. Then, the artificial intelligence engine configures data including the result of the analysis of the information, through the selected module. Also, the artificial intelligence engine receives a request for information from the user through the selected module.

Referring to FIG. 11B, the touch screen 1140 of the portable terminal displays multiple e-mails. When each e-mail is received, the artificial intelligence engine is activated, and analyzes information on the event. Then, the artificial intelligence engine configures data based on a result of the analysis, and outputs the configured data to the user. For example, when an e-mail 1141 about a best restaurant is received, the artificial intelligence engine analyzes the received e-mail, and configures data to be provided to the user. FIG. 11C is a view illustrating an example of analyzing an e-mail about a best restaurant and providing data to the user through an e-mail. Referring to FIG. 11C, a touch screen displays information on a virtual person corresponding to the artificial intelligence engine on an upper part screen 1160, and displays data configured through the received e-mail on a lower part screen 1170. Specifically, the configured data may include text 1150 configured by the virtual person corresponding to the artificial intelligence engine, and one or more photographs 1171 attached to the received e-mail. As described above, the artificial intelligence engine analyzes the received e-mail, and configures data as illustrated in FIG. 11C as if the artificial intelligence engine itself transmitted the e-mail to the user.

As described above, the artificial intelligence engine analyzes information on the best restaurant based on the received event, configures data to be provided to the user, and outputs the configured data to the touch screen. The configured data includes information to be provided to the user.

Through the text message, the user may input information into the artificial intelligence engine or may send a request for information to the artificial intelligence engine. When the user inputs information or makes a request for information through a text message, the artificial intelligence engine analyzes the input information or the request for the information; and determines whether the artificial intelligence engine can provide a response to the request by using information pre-stored in the portable terminal, or whether the artificial intelligence engine needs to provide the response to the request after the artificial intelligence engine connects to a separate server and receives information on the response. According to a result of the determination, the artificial intelligence engine configures data corresponding to the response, and may output the configured data to the user through the speaker or earphones, or may output the configured data to the user through the touch screen. In another example, the artificial intelligence engine may connect to a server which stores an answer to the request, may receive data from the server, and may configure the received data as data to be provided to the user.

Figure 12:
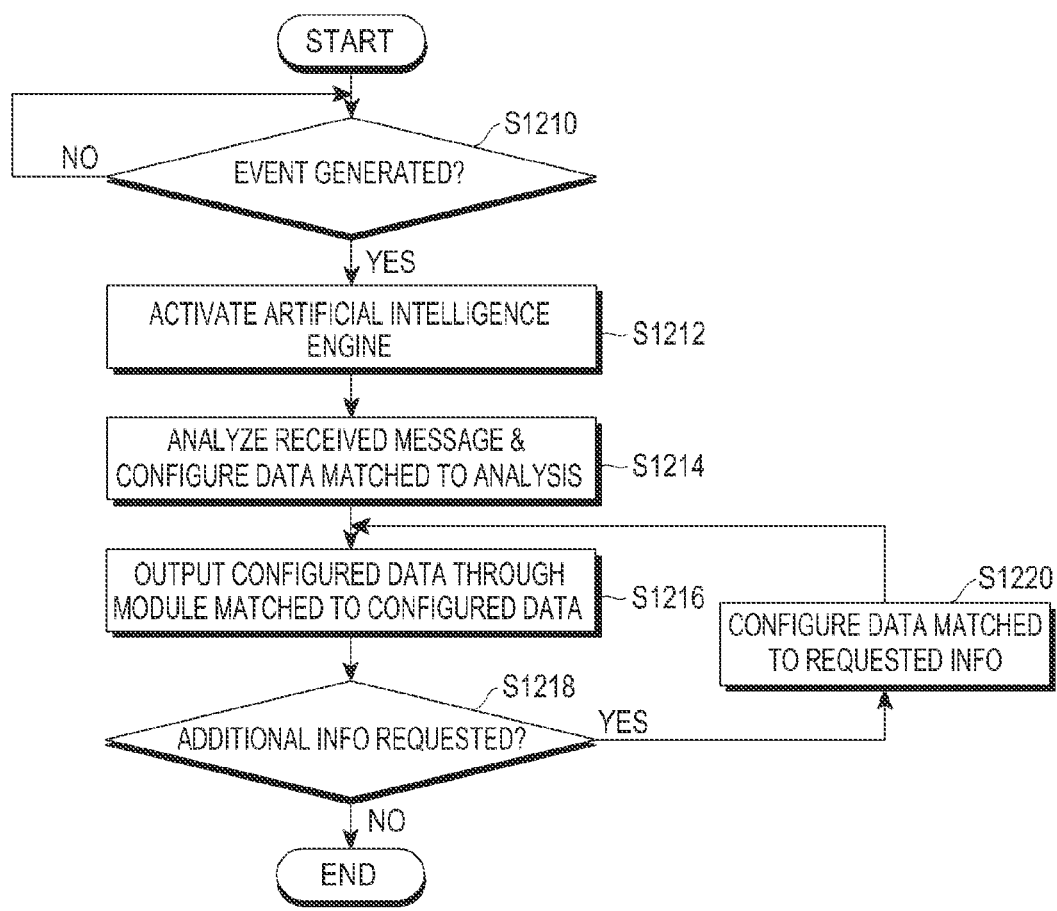
FIG. 12 is a flowchart illustrating a method for providing data through a module matched to a generated event when the event is generated in a portable terminal, according to another embodiment of the present invention.

FIG. 12 is a flowchart illustrating a method for providing data through a module matched to a generated event when the event is generated in a portable terminal, according to another embodiment of the present invention.

When an event is generated in step S1210, the controller activates an artificial intelligence engine, analyzes a received message and configures data matched to a result of the analysis of the received message, in steps S1212 and S1214. The portable terminal includes the artificial intelligence engine, and a user is capable of not only communicating with the artificial intelligence engine but is also capable of transmitting/receiving data to/from the artificial intelligence engine. When an event required to be provided to the user is generated or when the controller receives a text message requesting information from the user, the controller activates the artificial intelligence engine, analyzes information included in the generated event through the activated artificial intelligence engine, and configures data, which is intended to be provided to the user, in response to a result of the analysis of the information. The controller extracts a keyword from data matched to the received or generated event, and analyzes the information by using the extracted keyword. The information is data to be provided to the user. The event is used to notify the user of information with which a sender intends to provide the user, and may include at least one of the receipt of an e-mail, the receipt of a text message and the receipt of a call. Also, the event includes a pop-up window or the transmission of a call for notifying of a shortage of battery residual quantity of the portable terminal. Further, the information includes a keyword required to be provided to the user. Then, the controller performs a control operation for anthropomorphizing data configured for a response to a request that the user has input, and for providing the anthropomorphized data to the user. In the present example, the module which serves to communicate with the user, performs an operation for at least one of a voice call, a video call, a text message, a pop-up window and an e-mail.

The controller controls a relevant module to output the data configured in step S1214, in step S1216. The controller controls a selected module to anthropomorphize the configured data and provide the anthropomorphized data to the user. The controller selects the module for providing data to the user based on the result of the analysis, in step S1214. The multiple modules may exist depending on the type of generated event. Specifically, examples of the multiple modules may include an e-mail transmission/reception module; a text message transmission/reception module; a module which notifies the user of a shortage of battery residual quantity through a pop-up, a voice call, a message, and the like in the case of the shortage of battery residual quantity; and a telephone call module which provides a voice call and a video call. The controller analyzes information in response to an event received through each of the modules. The portable terminal includes multiple modules for providing information or data to the user. When the user inputs a request for information through the selected module, the controller configures data corresponding to a response to the input request. The configured data is configured to be provided to the user by using the extracted keyword. For example, when the controller intends to provide information to the user through a text message, the controller extracts a keyword in response to the received event, and generates a text message by using the extracted keyword. The text message is formed by using the extracted keyword, and is output to the user through the touch screen. The user can understand the contents of the received event through the output text message. When the controller intends to provide information to the user through an e-mail, the controller generates an e-mail and provides the generated e-mail to the user, as in the case where the controller intends to provide information to the user through the text message. When a picture file exists in the received event, the text data or e-mail is generated in such a manner as to add the picture file to the text data or e-mail. As described above, the artificial intelligence engine can use a context awareness module to communicate with the user through a text message or an e-mail. Accordingly, the artificial intelligence engine which can be anthropomorphized enables the user to receive an effect such that the user communicates with a virtual person as if the virtual person were a living person. Also, the artificial intelligence engine receives, as input, a request for information from the user, and configures data including a response corresponding to an analyzed request. Specifically, the artificial intelligence engine analyzes contents that the user has requested, and configures data corresponding to the response to the contents the user has requested, by using pre-stored data in the portable terminal. If the portable terminal does not store data corresponding to the response to the request, the portable terminal requests the data corresponding to the response to the request, to the server, and configures data by using a response to the contents that the user has requested. In other words, the artificial intelligence engine extracts the response to the analyzed request from information pre-stored in the portable terminal, or receives the response to the analyzed request from a server which stores information matched to the analyzed request, and provides the response to the analyzed request to the user. The artificial intelligence engine configures data so as to provide the response to the request to the user, as a text message or an e-mail.

When the user requests additional information in step S1218, the controller configures data matched to the requested additional information and controls a relevant module to output the configured data, in steps S1220 and S1216. When the user requests additional information, the controller controls the artificial intelligence engine to analyze the requested information. Then, the controller determines whether a response can be provided to the requested information or an inquiry by the user by using pre-stored data, or whether the controller needs to provide the received response to the user after the controller receives the response from a server which provides responses. When a request for additional information is received from the user after the configured data is output to the user in step S1216, the controller configures data including a response to the requested additional information, anthropomorphizes the configured data, and again outputs the anthropomorphized data to the user. When an input corresponding to an additional request is received from the user, the controller obtains a response to the request by using data pre-stored in the portable terminal, or by performing a control operation for connecting to a server matched to the request. The pre-stored data includes information which is displayed on the touch screen of the portable terminal or which is obtained through a web page. Also, examples of the server may include servers according to various contents, such as a server of the Meteorological Office which provides weather information according to a user's inquiry, a location-based server which provides a location, and the like.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory integrated circuit (IC), or a recordable optical or magnetic medium such as a CD, a DVD, a magnetic disk, or a magnetic tape, regardless of its ability to be erased or its ability to be re-recorded. It will be appreciated that a memory, which may be incorporated in a portable terminal, may be an example of a machine-readable storage medium which is suitable for storing a program or programs including commands to implement the embodiments of the present invention. The embodiments of the present invention provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present invention properly includes the things equivalent to that.

Moreover, the above-described mobile terminal can receive the program from a program provision device which is connected thereto in a wired or wireless manner, and store the program. The device for providing a program may include a memory for storing a program including instructions which control the provision of data by the portable terminal, information that the portable terminal needs in order to provide data to a user, and the like; a communication unit for performing wired or wireless communication with the portable terminal; and a controller for performing a control operation for transmitting the relevant program to a host device at a request from the portable terminal or automatically.

Although embodiments of the invention have been described in detail hereinabove, a person of ordinary skill in the art will understand and appreciate that many variations and modifications of the basic inventive concept described herein will still fall within the spirit and scope of the invention as defined in the following claims and their equivalents.

What is claimed is:

1. A method for providing data by a portable terminal, the method comprising:
   sensing generation of an event from a user of the portable terminal, and activating an artificial intelligence engine based on the event for providing communication with the user;
   extracting key information from information request event subsequent to the event from the user;
   accessing and obtaining a responsive information from a server using the key information;
   selecting a module by the activated artificial intelligence engine as a medium of communication with the user of the portable terminal;
   configuring data including the obtained responsive information and additional information related to the obtained responsive information, wherein the data is configured so as to be anthropomorphized; and
   providing the configured data by using the selected module by the activated intelligence engine, to the user in a form of at least one of a voice, an image, and a message,
   wherein the module anthropomorphizes data configured for a response to a request that the user has touch input, and provides the anthropomorphized data to the user.

2. The method as claimed in claim 1, further comprising configuring data corresponding to a response to an input request and providing the configured data to the user through the selected module, when the user inputs a request for information through the selected module.

3. The method as claimed in claim 1, wherein the data is configured by anthropomorphizing by using the extracted keyword, and wherein the anthropomorphized data is provided to the user.

4. The method as claimed in claim 1, wherein the event is used to give notice to the user, and comprises at least one of:
   reception of an e-mail;
   reception of a text message;
   generation of a shortage of battery residual quantity; and
   reception of a call.

5. The method as claimed in claim 1, wherein the module provides the event to the user, and is different for each type of the event.

6. The method as claimed in claim 1, wherein the module comprises at least one of:
   a voice call module;
   a video call module;
   a text message module;
   a pop-up window module; and
   an e-mail module.

7. The method as claimed in claim 1, wherein, when the event is reception of an e-mail or reception of a text message, the module extracts at least one of a keyword and a picture included in the received e-mail or text message, configures data by using the extracted at least one of the keyword and the picture, and provides the configured data to the user through at least one of a voice call, a video call, and a pop-up window.

8. The method as claimed in claim 1, wherein, when the event is generation of a shortage of a residual quantity of a battery of the portable terminal, the module extracts the residual quantity of the battery, configures data by using the extracted residual quantity of the battery, and provides the configured data to the user through at least one of a voice call, a video call, and a pop-up window.

9. The method as claimed in claim 1, wherein, when the event is reception of a call, the module configures data in response to extraction of at least one of a name of a user who has transmitted the call, and a telephone number of a portable terminal that has transmitted the call, the module anthropomorphizes the configured data, and the module provides the anthropomorphized data to the user through at least one of a voice call, a video call, and a pop-up window.

10. The method as claimed in claim 1, further comprising:
    analyzing an input request of a user of the portable terminal by the activated artificial intelligence engine; and
    configuring data including a response to the analyzed request, when the user inputs the request for information.

11. The method as claimed in claim 10, wherein the event comprises at least one of a call and a message which are received from the user.

12. The method as claimed in claim 11, wherein the artificial intelligence engine analyzes the request by using a voice received as an input from the user, when the event is reception of the call.

13. The method as claimed in claim 11, wherein the artificial intelligence engine analyzes the request by using text of a message received as an input from the user, when the event is reception of the message.

14. The method as claimed in claim 10, wherein the artificial intelligence engine extracts the response to the analyzed request from pre-stored information, or receives the response to the analyzed request from a server that stores information matched to the analyzed request; configures the data so as to be anthropomorphized; and provides the configured data to the user.

15. The method as claimed in claim 10, wherein the artificial intelligence engine configures the data so as to anthropomorphize a response to the request by using a voice, an image or a message, and provides the anthropomorphized response to the request to the user.

16. The method as claimed in claim 10, wherein the artificial intelligence engine is included in the portable terminal, and is capable of communicating with the user through at least one of a voice call, a video call and transmission/reception of a message.

17. A portable terminal that provides data, the portable terminal comprising:
a transmission/reception unit that receives an event to be provided to a user; and
a controller configured to:
sense generation of the event from the user of the portable terminal, activate an artificial intelligence engine based on the event for providing communication with the user,
extract key information from information request event subsequent to the event from the user,
accessing and obtaining a responsive information from a server using the key information,
select a module by the activated artificial intelligence engine as a medium of communication with the user of the portable terminal,
configure data including the obtained responsive information and additional information related to the obtained responsive information, wherein the data is configured so as to be anthropomorphized, and
provide the configured data by using the selected module by the activated intelligence engine, to the user as a form of at least one of a voice, an image, and a message,
wherein the module anthropomorphizes data configured for a response to a request that the user has touch input, and provides the anthropomorphized data to the user.

18. The portable terminal as claimed in claim 15, wherein the controller configures data corresponding to a response to an input request by the user so as to be anthropomorphized and provides the anthropomorphized data to the user through the selected module, when the user inputs the request for information through the selected module.

19. The portable terminal as claimed in claim 15, wherein the controller configures data in such a by anthropomorphizing the data by using the extracted keyword, and wherein the anthropomorphized data is provided to the user.

20. The portable terminal as claimed in claim 15, wherein the event is used to give notice to the user, and comprises at least one of:
reception of an e-mail;
reception of a text message;
generation of a shortage of battery residual quantity; and
reception of a call.

21. The portable terminal as claimed in claim 15, wherein the module provides the event to the user, and is different for each type of the event.

22. The portable terminal as claimed in claim 15, wherein the module comprises at least one of:
a voice call module;
a video call module;
a text message module;
a pop-up window module; and
an e-mail module.

23. The portable terminal as claimed in claim 15, wherein, when the event is reception of an e-mail or reception of a text message, the controller extracts at least one of a keyword and a picture included in the received e-mail or text message, configures data so as to be anthropomorphized by using the extracted at least one of the keyword and the picture, and provides the configured data to the user through at least one of a voice call, a video call, and a pop-up window.

24. The portable terminal as claimed in claim 15, wherein, when the event is generation of a shortage of a residual quantity of a battery of the portable terminal, the controller extracts the residual quantity of the battery, configures data by using the extracted residual quantity of the battery, and provides the configured data to the user through at least one of a voice call, a video call, and a pop-up window.

25. The portable terminal as claimed in claim 15, wherein, when the event is reception of a call, the controller configures data so as to be anthropomorphized, in response to extraction of at least one of a name of a user who has transmitted the call, and a telephone number of a portable terminal that has transmitted the call; and provides the configured data to the user through at least one of a voice call, a video call, and a pop-up window.

26. The portable terminal as claimed in claim 15, wherein, when the user inputs a request for information, the controller activates an artificial intelligence engine, analyzes the input request, and configures data including a response to the analyzed request.

27. The portable terminal as claimed in claim 26, wherein the artificial intelligence engine extracts the response to the analyzed request from pre-stored information, or receives the response to the analyzed request from a server which stores information matched to the analyzed request; anthropomorphizes the response to the analyzed request; and provides the anthropomorphized response to the analyzed request to the user.

28. The portable terminal as claimed in claim 26, wherein the artificial intelligence engine analyzes the request by using a voice received as an input from the user, when the event is reception of a call.

29. The portable terminal as claimed in claim 26, wherein the artificial intelligence engine analyzes the request by using text of a message received as an input from the user, when the event is reception of a message.

30. The portable terminal as claimed in claim 26, wherein the artificial intelligence engine configures the data so as to anthropomorphize a response to the request by using a voice, an image or a message, and provide the anthropomorphized response to the request to the user.

31. The portable terminal as claimed in claim 15, wherein the controller configures the data so as to be anthropomorphized through an artificial intelligence engine.

32. A non-transitory computer-readable storage medium having stored thereon instructions that, when executed, cause at least one processor to perform a method for providing data by a portable terminal, the method comprising:
sensing generation of an event from a user of the portable terminal;

activating an artificial intelligence engine based on the event for providing communication with the user;

extracting key information from information request event subsequent to the event from the user;

accessing and obtaining a responsive information from a serve using the key information;

selecting a module by the activated artificial intelligence engine as a medium of communication with the user of the portable terminal;

configuring data including the obtained responsive information and additional information related to the obtained responsive information, wherein the data is configured so as to be anthropomorphized; and providing the configured data, by using the selected module by the activated intelligence engine, to the user, wherein the module anthropomorphizes data configured for a response to a request that the user has touch input, and provides the anthropomorphized data to the user.

33. A non-transitory computer-readable storage medium having stored thereon instructions that, when executed, cause at least one processor to perform a method for providing data by a portable terminal, the method comprising:

sensing reception of an event, and activating an artificial intelligence engine based on the event for providing communication with the user of the portable terminal;

analyzing an input request of a user of the portable terminal by the activated artificial intelligence engine;

selecting a module by the activated artificial intelligence engine as a medium of communication with the user of the portable terminal and configuring data including a response to the analyzed request, when the user inputs the request for information; and providing the configured data by using the selected module by the activated intelligence engine, to a user in a form of at least one of a voice, an image, and a message, wherein the data is configured so as to be anthropomorphized, and wherein the module anthropomorphizes data configured for a response to a request that the user has touch input, and provides the anthropomorphized data to the user.

* * * * *